United States Patent
Huang et al.

(10) Patent No.: US 10,341,387 B2
(45) Date of Patent: *Jul. 2, 2019

(54) METHODS AND SYSTEMS FOR APPLYING SECURITY POLICIES IN A VIRTUALIZATION ENVIRONMENT USING A SECURITY INSTANCE

(71) Applicant: NeuVector, Inc., Milpitas, CA (US)

(72) Inventors: Fei Huang, San Jose, CA (US); Gang Duan, San Jose, CA (US)

(73) Assignee: NEUVECTOR, INC., Milpitas, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/427,004

(22) Filed: Feb. 7, 2017

(65) Prior Publication Data
US 2017/0353499 A1 Dec. 7, 2017

Related U.S. Application Data

(60) Provisional application No. 62/346,384, filed on Jun. 6, 2016, provisional application No. 62/346,380, filed on Jun. 6, 2016.

(51) Int. Cl.
*G06F 17/00* (2019.01)
*H04L 29/06* (2006.01)
(Continued)

(52) U.S. Cl.
CPC .......... *H04L 63/20* (2013.01); *G06F 9/45558* (2013.01); *H04W 12/08* (2013.01); *G06F 2009/45587* (2013.01)

(58) Field of Classification Search
USPC .......................................................... 726/1
See application file for complete search history.

(56) References Cited

U.S. PATENT DOCUMENTS 5,560,013 A * 9/1996 Scalzi ....................... G06F 8/52
717/138
6,205,528 B1 * 3/2001 Kingsbury .......... G06F 12/1072
711/153
(Continued)

OTHER PUBLICATIONS

Huang, Office Action, U.S. Appl. No. 15/426,998, dated Nov. 2, 2018, 16 pgs.
(Continued)

*Primary Examiner* — Amare F Tabor
(74) *Attorney, Agent, or Firm* — Morgan, Lewis & Bockius LLP

(57) ABSTRACT

The various implementations described herein include systems, methods and/or devices method for applying security policies in a virtualization environment. In one aspect, the method is performed at an electronic device of a plurality of electronic devices in a computing network, the electronic device having one or more processors and memory storing instructions for execution by the one or more processors. A plurality of user-space instances is instantiated. Furthermore, a security instance distinct from the plurality of user-space instances is instantiated. The security instance, which executes in user space of a respective virtual address space, monitors operations and data communications for the plurality of user-space instances. The security instance applies security policies to the monitored operations and data communications for the plurality of user-space instances so as to detect and/or remediate violations of the security policies.

21 Claims, 14 Drawing Sheets

(51) Int. Cl.
*G06F 9/455* (2018.01)
*H04W 12/08* (2009.01)

(56) References Cited

U.S. PATENT DOCUMENTS

| | | | |
|---|---|---|---|
| 7,484,245 B1 * | 1/2009 | Friedman | G06F 21/52 |
| | | | 380/283 |
| 7,739,498 B2 * | 6/2010 | Barnes | G06F 12/1491 |
| | | | 713/164 |
| 7,840,750 B2 * | 11/2010 | Baek | G06F 21/606 |
| | | | 711/112 |
| 8,166,474 B1 * | 4/2012 | Delco | G06F 9/45558 |
| | | | 709/226 |
| 8,775,534 B2 | 7/2014 | Laval | |
| 2006/0053216 A1 * | 3/2006 | Deokar | G06F 21/6218 |
| | | | 709/223 |
| 2007/0078913 A1 * | 4/2007 | Crescenti | G06F 11/1464 |
| 2007/0180257 A1 * | 8/2007 | Bae | G06F 21/62 |
| | | | 713/182 |
| 2008/0229041 A1 | 9/2008 | Baek | |

OTHER PUBLICATIONS

Huang, Notice of Allowance, U.S. Appl. No. 15/426,998, dated Feb. 8, 2019, 5 pgs.

* cited by examiner

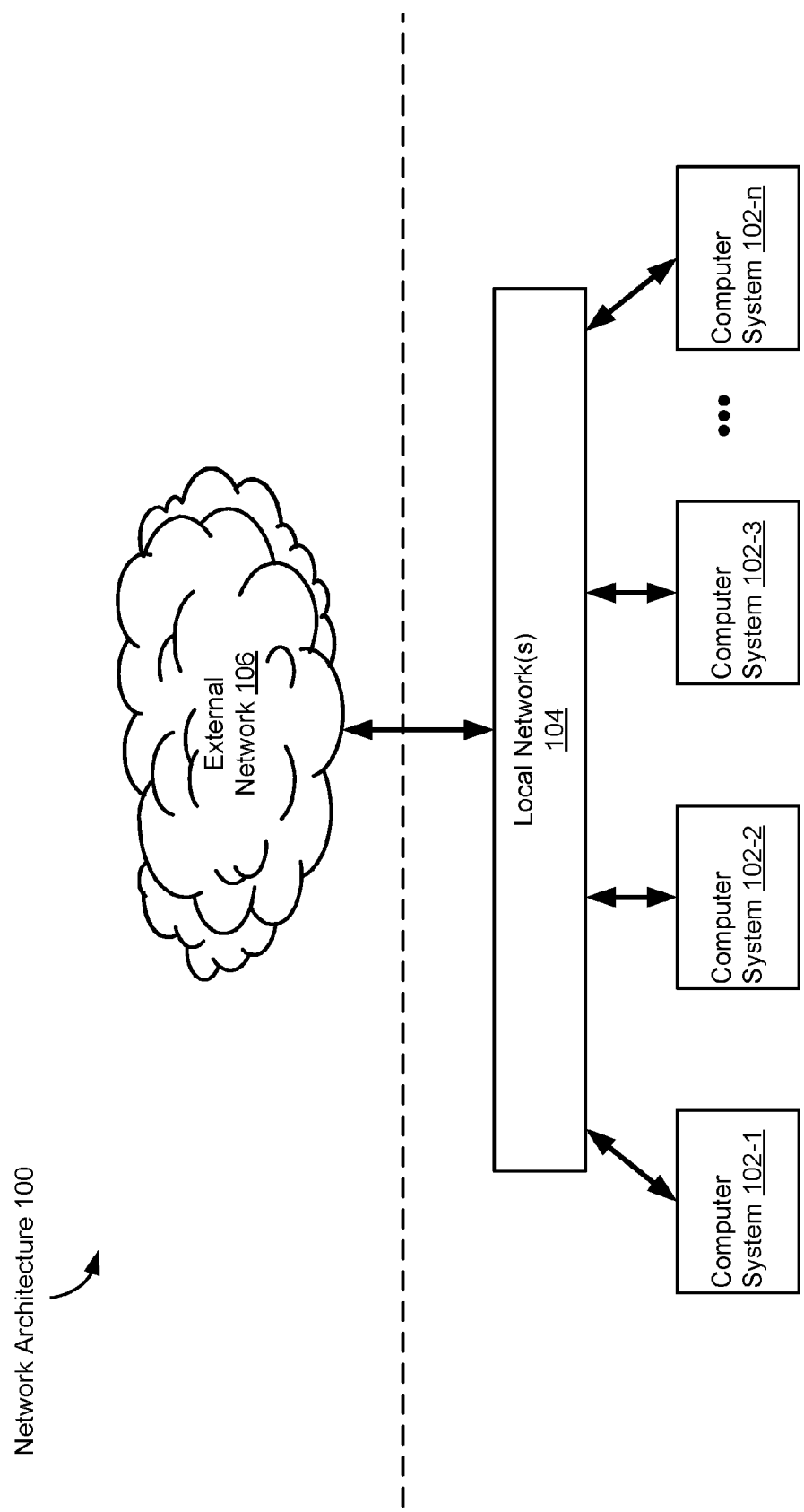

METHODS AND SYSTEMS FOR APPLYING SECURITY POLICIES IN A VIRTUALIZATION ENVIRONMENT USING A SECURITY INSTANCE

RELATED APPLICATIONS

This application claims priority to U.S. Provisional Patent Application No. 62/346,384, filed Jun. 6, 2016, and U.S. Provisional Patent Application No. 62/346,380, filed Jun. 6, 2016, each of which is hereby incorporated by reference in its entirety.

TECHNICAL FIELD

This relates generally to securing computer systems, including but not limited to applying security policies in a virtualization environment.

BACKGROUND

Virtualization technology enables the creation of isolated environments for running applications on a host system. Some virtualization technologies, such as virtual machines, emulate multiple system platforms within a single host system, where each system platform includes a hardware layer and a full operating system environment.

Other virtualization technologies, such as operating-system-level virtualization, also allow multiple application instances to run simultaneously on a single host system. In these cases, however, overhead is significantly reduced given that multiple operating system environments are not emulated. These virtualization technologies provide application instances with a layer of protection, as they are isolated from the host and its applications.

As a result of application instances being isolated from the host operating system, however, traditional methods with respect to the host operating system are unable to accomplish effective live traffic monitoring for the application instances. For similar reasons, the detection and resolution of security breaches is equally challenging in such virtualization systems.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable: (i) instantiating a plurality of user-space instances, (ii) identifying respective properties that characterize the user-space instances, (iii) based on the identified properties, identifying respective security policies that define authorized or unauthorized operations and data communications for user-space instances, and (iv) applying the identified security policies so as to detect and/or remediate violations of the identified set of security policies.

In one aspect, a plurality of user-space instances is instantiated. Each respective user-space instance of the plurality of user-space instances is instantiated within a respective operating system environment, each respective user-space instance having a distinct virtual address space in virtual memory of the respective operating system environment. The respective virtual addresses of the user-space instances are distinct from a kernel address space of the virtual memory. Furthermore, one or more respective properties that characterize the user-space instances of the plurality of user-space instances are identified. Based on the one or more identified properties characterizing the user-space instances, one or more clusters of user-space instances are formed from the plurality of user-space instances, where each cluster of the one or more clusters includes a respective set of one or more user-space instances that are characterized by one or more common properties of the one or more identified properties. Furthermore, for each respective cluster of the one or more clusters, a respective set of security policies are identified that define authorized or unauthorized operations for respective user-space instances in the respective cluster, and authorized or unauthorized data communications sent by and/or received by respective user-space instances in the respective cluster. For each respective cluster of the one or more clusters, the identified set of security policies is applied for the respective cluster so as to detect and/or remediate violations of the identified set of security policies.

In another aspect, a plurality of user-space instances is instantiated. Each respective user-space instance of the plurality of user-space instances is instantiated within a respective operating system environment, each respective user-space instance having a distinct virtual address space in virtual memory of the respective operating system environment. The respective virtual addresses of the user-space instances are distinct from a kernel address space of the virtual memory. Furthermore, a security instance distinct from the plurality of user-space instances is instantiated, wherein the security instance is instantiated within the respective operating system environment and is executed in user space of a respective virtual address space in virtual memory of the respective operating system environment. The security instance is used to monitor operations for the plurality of user-space instances, and data communications sent by and/or received by the plurality of user-space instances. For each respective user-space instance of the plurality of user-space instances, the security instance applies a respective set of security policies associated with the respective user-space instance to the monitored operations for the respective user-space instance and the monitored data communications sent by and/or received by the respective user-space instance, so as to detect and/or remediate violations of the respective set of security policies.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 1A is a block diagram illustrating a distributed system, having an exemplary network architecture, for instantiating and providing security for user-space instances, in accordance with some embodiments.

Figure 1B:
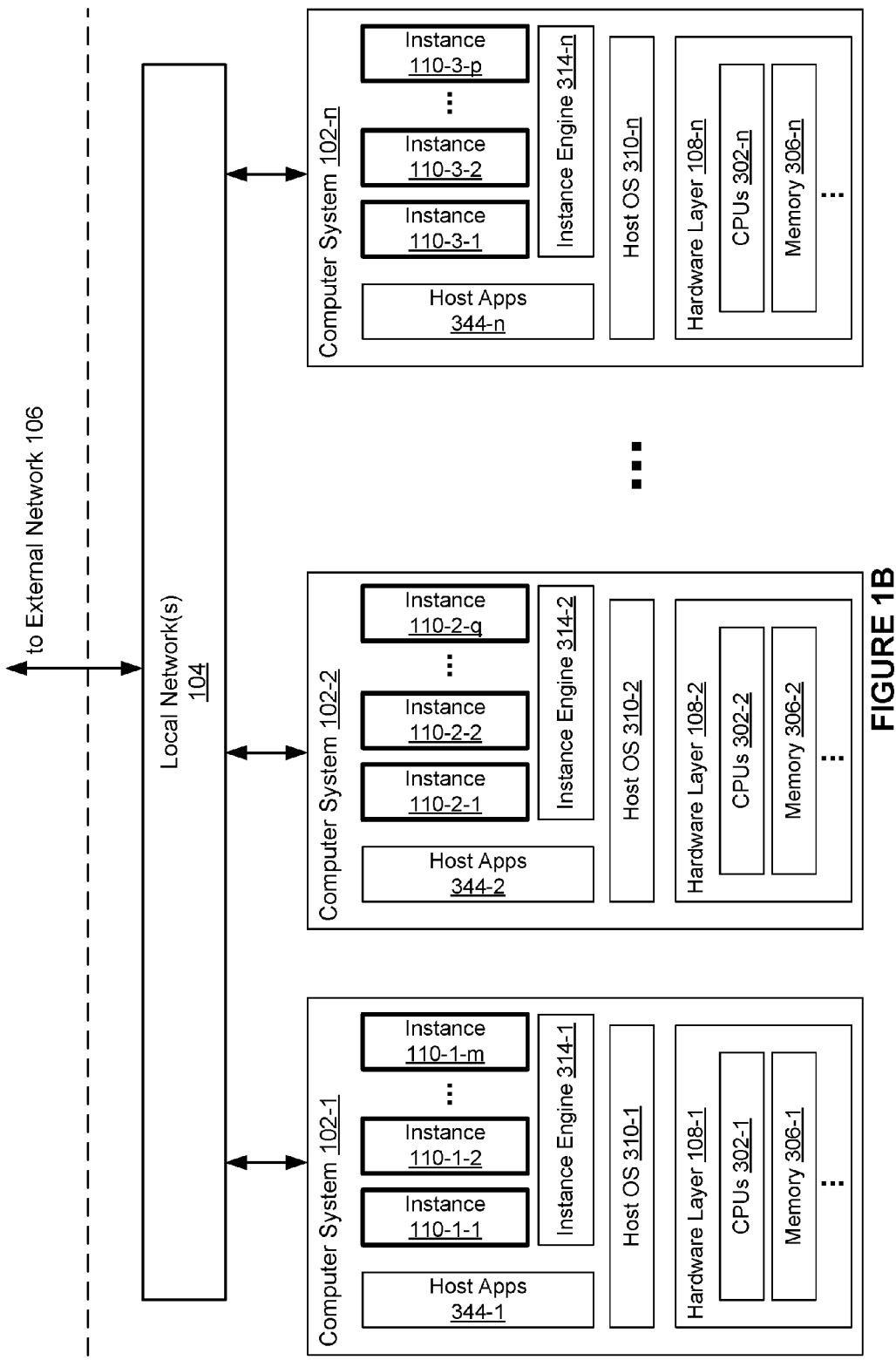
FIG. 1B is a block diagram illustrating multiple user-space instances, instantiated within an exemplary computing network, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

The various implementations described herein include systems, methods and/or devices used to enable: (i) instantiating a plurality of user-space instances, (ii) identifying respective properties that characterize the user-space instances, (iii) based on the identified properties, identifying respective security policies that define authorized or unauthorized operations and data communications for user-space instances, and (iv) based on the identified properties, applying the identified security policies so as to detect and/or remediate violations of the identified set of security policies.

(A1) More specifically, some implementations include a method of applying security policies in a virtualization environment. The method is performed at an electronic device of a plurality of electronic devices in a computing network, the electronic device having one or more processors and memory storing instructions for execution by the one or more processors. In some implementations, the method includes instantiating a plurality of user-space instances. Each respective user-space instance of the plurality of user-space instances is instantiated within a respective operating system environment, each respective user-space instance having a distinct virtual address space in virtual memory of the respective operating system environment. The respective virtual address spaces of the user-space instances are distinct from a kernel address space of the virtual memory. Furthermore, one or more respective properties that characterize the user-space instances of the plurality of user-space instances are identified. Based on the one or more identified properties characterizing the user-space instances, one or more clusters of user-space instances are formed from the plurality of user-space instances, wherein each cluster of the one or more clusters includes a respective set of one or more user-space instances that are characterized by one or more common properties of the one or more identified properties. Furthermore, for each respective cluster of the one or more clusters, a respective set of security policies are identified that define authorized or unauthorized operations for respective user-space instances in the respective cluster, and authorized or unauthorized data communications sent by and/or received by respective user-space instances in the respective cluster. For each respective cluster of the one or more clusters, the identified set of security policies is applied for the respective cluster so as to detect and/or remediate violations of the identified set of security policies (A2) In some embodiments of the method of A1, instantiating the plurality of user-space instances includes instantiating the plurality of the user-space instances within a first operating system environment of a first virtual machine.

(A3) In some embodiments of the method of A1 or A2, the method further includes applying a set of system-level security policies, implemented by the respective operating system environment, to operations performed by and communications sent by and/or received by the plurality of user-space instances.

(A4) In some embodiments of the method of any of A1-A3, a first subset of the plurality of user-space instances is instantiated within a first operating system environment of a first virtual machine, and a second subset of the plurality of user-space instances distinct from the first subset is instantiated within a second operating system environment of a second virtual machine distinct from the first virtual machine.

(A5) In some embodiments of the method of A4, a first cluster of the one or more formed clusters includes user-space instances from both of the first and second subsets of the plurality of user-space instances.

(A6) In some embodiments of the method of any of A1-A5, the one or more respective properties include at least one of: a user-space instance type, a user-space instance sub-type, a user-space instance version, a user-space instance name, associated access controls for a respective user-space instance, a respective network communication protocol used by a respective user-space instance, and a respective network communications port used for data communications.

(A7) In some embodiments of the method of A6, the user-space instance type corresponds to user-space instances that are applications accessible via an external network.

(A8) In some embodiments of the method of A6 or A7, the user-space instance type corresponds to user-space instances that are database applications.

(A9) In some embodiments of the method of A8, the database applications corresponding to the user-space instance type do not have direct access to an external network.

(A10) In some embodiments of the method of any of A1-A9, identifying the one or more respective properties comprises inspecting communications sent by and/or received by the user-space instances of the plurality of user-space instances; and deriving at least some of the one or more respective properties from the inspected communications.

(A11) In some embodiments of the method of A10, the inspected communications include data packets, each comprising a respective header portion and a respective data portion. Furthermore, inspecting the communications comprises inspecting at least the data portions of the data packets.

(A12) In some embodiments of the method of A10 or A11, the inspected communications include data sent by a first user-space instance of the plurality of user-space instances to a second user-space instance of the plurality of user-space instances.

(A13) In some embodiments of the method of A12, the first user-space instance is instantiated within a first operating system environment of a first virtual machine, and the second user-space instance is instantiated within a second operating system environment of a second virtual machine distinct from the first virtual machine.

(A14) In some embodiments of the method of any of A10-A13, the inspected communications include data sent by and/or received by a first user-space instance, of the plurality of user-space instances, over an external network to which the computing network is communicably connected.

(A15) In some embodiments of the method of any of A1-A14, identifying the one or more respective properties comprises obtaining meta data specifying at least some of the one or more respective properties.

(A16) In some embodiments of the method of any of A1-A15, applying the identified set of security policies for each respective cluster of the one or more clusters comprises: monitoring the operations for the respective user-space instances in the respective cluster, and/or monitoring the data communications sent by and/or received by the respective user-space instances in the respective cluster; detecting a violation of the identified set of security policies for the respective cluster in the monitored operations and/or the monitored communications; and in response to detecting the violation, remediating the violation.

(A17) In some embodiments of the method of A16, detecting the violation includes detecting attempts to access an external network by one or more of the respective user-space instances in the respective cluster that are not authorized to access, or have not previously accessed, the external network.

(A18) In some embodiments of the method of A16, detecting the violation includes detecting attempts by a first user-space instance, of the respective user-space instances in the respective cluster, to transmit data managed by a second user-space instance of the plurality of user-space instances to an external network, wherein the first user-space instance is authorized to access the external network, and the second user-space instance is not authorized to access the external network.

(A19) In some embodiments of the method of A16, detecting the violation includes detecting attempts to access a first user-space instance, of the respective user-space instances in the respective cluster, wherein the access attempts originate from an external network that is not authorized to access the first user-space instance.

(A20) In some embodiments of the method of A16, detecting the violation includes detecting attempts by a first user-space instance, of the respective user-space instances in the respective cluster, to access a second user-space instance of the plurality of user-space instances, wherein the first user-space instance is not authorized to access, or has not previously accessed, the second user-space instance.

(A21) In some embodiments of the method of any of A16-A20, remediating the violation includes generating an alert for the violation.

(A22) In some embodiments of the method of any of A16-A21, remediating the violation includes terminating one or more of the plurality of user-space instances that violated the identified set of security policies for the respective cluster.

(A23) In some embodiments of the method of any of A16-A21, remediating the violation includes modifying access privileges of one or more of the plurality of user-space instances that violated the identified set of security policies for the respective cluster.

(A24) In some embodiments of the method of any of A16-A23, a first cluster includes a first subset and a second subset of user-space instances, and a first set of security policies for the first cluster includes a first subset of security policies that apply to the first subset of user-space instances, and a second subset of security policies that apply to the second subset of user-space instances.

(A25) In some embodiments of the method of A24, the first subset and second subset of user-space instances correspond to first and second user-space instance sub-types of a same user-space instance type.

(A26) In some embodiments of the method of any of A16-A25, identifying the one or more respective properties and applying the identified set of security policies are performed by a security-enforcement instance distinct from the plurality of user-space instances.

(A27) In another aspect, a computer system in a computing network includes one or more processors, a communication interface for communicating with other computer systems in the computing network, and memory storing one or more programs for execution by the processor, the one or more programs including instructions for performing the method of any of A1-A26.

(A28) In another aspect, a non-transitory computer readable storage medium stores one or more programs that when executed by one or more processors of a computer system cause the computer system to perform the method of any of A1-A26.

(B1) Some implementations include a method of applying security policies in a virtualization environment. The method is performed at an electronic device of a plurality of electronic devices in a computing network, the electronic device having one or more processors and memory storing instructions for execution by the one or more processors. In some implementations, the method includes instantiating a plurality of user-space instances. Each respective user-space instance of the plurality of user-space instances is instantiated within a respective operating system environment, each respective user-space instance having a distinct virtual address space in virtual memory of the respective operating system environment. The respective virtual address spaces of the user-space instances are distinct from a kernel address space in which operating system processes are performed. Furthermore, a security instance (sometimes called a security user-space instance) distinct from the plurality of user-space instances is instantiated, wherein the security instance is instantiated within the respective operating system environment, and has a respective virtual address space in virtual memory of the respective operating system environment. The security instance executes in user-space of the respective virtual address space, and is used to monitor operations of the plurality of user-space instances and data communications sent by and/or received by the plurality of user-space instances. For each respective user-space instance of the plurality of user-space instances, the security instance is used to apply a respective set of security policies associated with the respective user-space instance to the monitored operations for the respective user-space instance, and the monitored data communications sent by and/or received by the respective user-space instance, so as to detect and/or remediate violations of the respective set of security policies.

(B2) In some embodiments of the method of B1, using the security instance to apply the respective set of security policies comprises, for each respective user-space instance of the plurality of user-space instances: intercepting one or more data communications sent by and/or sent to the respective user-space instance; detecting a violation of the respective set of security policies associated with the respective user-space instance; and in response to detecting the violation, denying transmission of the one or more data communications sent by and/or sent to the respective user-space instance.

(B3) In some embodiments of the method of B1 or B2, using the security instance to apply the respective set of security policies comprises, for each respective user-space instance of the plurality of user-space instances: detecting a violation of the respective set of security policies associated with the respective user-space instance; and in response to detecting the violation, sending remedial commands to one or more of the plurality of user-space instances that violated the respective set of security policies for the respective user-space instance.

(B4) In some embodiments of the method of any one of B1-B3, the method further comprises using the security instance to identify one or more respective properties that characterize the plurality of user-space instances.

(B5) In some embodiments of the method of B4, the one or more respective properties are identified at least in part from the data communications sent by and/or received by the plurality of user-space instances.

(B6) In some embodiments of the method of B4 or B5, the method further comprises, for each respective user-space instance of the plurality of user-space instances: based on the one or more identified properties, using the security instance to identify the respective set of security policies, wherein the respective set of security policies define authorized or unauthorized operations for the respective user-space instance, and authorized or unauthorized data communications sent by and/or received by the respective user-space instance.

(B7) In some embodiments of the method of B4-B6, the method further comprises, for each respective user-space instance of the plurality of user-space instances: based on the one or more identified properties, using the security instance to form one or more clusters of user-space instances from the plurality of user-space instances, wherein each cluster of the one or more clusters includes a respective set of one or more user-space instances that are characterized by one or more common properties of the one or more identified properties.

(B8) In some embodiments of the method of B4, the method further comprises sending the one or more identified properties to a central module remote from the electronic device.

(B9) In some embodiments of the method of B8, the method further comprises receiving, from the central module, the respective set of security policies for each respective user-space instance of the plurality of user-space instances, wherein the respective set of security policies for the respective user-space instance is based on one or more corresponding properties of the one or more identified properties for the respective user-space instance.

(B10) In some embodiments of the method of any one of B1-B9, the method further comprises receiving the respective sets of security policies for the plurality of user-space instances from a central module remote from the electronic device.

(B11) In some embodiments of the method of any one of B1-B10, the plurality of user-space instances is a first plurality of user-space instances instantiated within a first operating system environment of a first virtual machine; a second plurality of user-space instances distinct from the first plurality of user-space instances is instantiated within a second operating system environment of a second virtual machine distinct from the first virtual machine; and the security instance is a first security instance that is instantiated within the first operating system environment of the first virtual machine. The method further comprises instantiating a second security instance within the second operating system environment of the second virtual machine, wherein the second security instance is distinct from the first security instance and the first and second pluralities of user-space instances, and wherein the second security instance is executed in user space of a respective virtual address space in virtual memory of the second operating system environment. Furthermore, the method comprises using the second security instance to monitor operations for the second plurality of user-space instances, and data communications sent by and/or received by the second plurality of user-space instances. For each respective user-space instance of the second plurality of user-space instances, the method includes using the second security instance to apply a respective set of security policies associated with the respective user-space instance of the second plurality of user-space instances to the monitored operations for the respective user-space instance, and the monitored data communications sent by and/or received by the respective user-space instance of the second plurality of user-space instances, so as to detect and/or remediate violations of the respective set of security policies associated with the respective user-space instance of the second plurality of user-space instances.

(B12) In some embodiments of the method of any one of B1-B11, a respective user-space instance of the plurality of user-space instances corresponds to a respective cluster of one or more clusters of user-space instances, the respective cluster including a respective set of user-space instances that are characterized by two or more common properties; and the respective set of security policies for each respective user-space instance is further associated with a corresponding cluster of the one or more clusters of user-space instances.

(B13) Some implementations include a method of applying security policies in a virtualization environment. The method is performed at an electronic device of a plurality of electronic devices in a computing network, the electronic device having one or more processors and memory storing instructions for execution by the one or more processors. In some implementations, the method includes instantiating a plurality of user-space instances. Each respective user-space instance of the plurality of user-space instances is instantiated within a respective operating system environment, each respective user-space instance having a distinct virtual address space in virtual memory of the respective operating system environment. The respective virtual address spaces of the user-space instances are distinct from a kernel address space in which operating system processes are performed. Each of the plurality of user-space instances corresponds to a respective cluster of one or more clusters of user-space instances, wherein each of the one or more clusters includes a respective set of one or more user-space instances that are characterized by one or more common properties. The method furthermore includes instantiating a security user-space instance distinct from the plurality of user-space instances, wherein the security user-space instance is instantiated within a respective operating system environment and has a respective virtual address space in virtual memory of the respective operating system environment; using the security user-space instance to monitor operations for the plurality of user-space instances, and data communications sent by and/or received by the plurality of user-space instances; and, for each respective cluster of the one or more clusters, using the security user-space instance to apply a respective set of security policies associated with the respective cluster to the monitored operations for respective user-space instances of the respective cluster, and the monitored data communications sent by and/or received by the respective user-space instances of the respective cluster, so as to detect and/or remediate violations of the respective set of security policies.

(B14) In another aspect, a computer system in a computing network includes one or more processors, a communication interface for communicating with other computer systems in the computing network, and memory storing one or more programs for execution by the processor, the one or more programs including instructions for performing the method of any of B1-B13.

(B15) In another aspect, a non-transitory computer readable storage medium stores one or more programs that when executed by one or more processors of a computer system cause the computer system to perform the method of any of B1-B13.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-space instance could be termed a second user-space instance, and, similarly, a second user-space instance could be termed a first user-space instance, without departing from the scope of the various described embodiments. The first user-space instance and the second user-space instance are both user-space instances, but they are not the same user-space instance.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1A is a block diagram illustrating a distributed system 100, using an exemplary network architecture, for instantiating and providing security for user-space instances, in accordance with some embodiments. The distributed system 100 includes a number of computer systems 102 (also called "server systems," or "servers") 102-1, 102-2, . . . 102-n communicably connected to an external network 106 (e.g., the Internet, cellular telephone networks, mobile data networks, other wide area networks, metropolitan area networks, etc., or a combination of such networks) by one or more local networks 104 (e.g., local area networks). As described in greater detail below, in some embodiments, computer systems 102 implement one or more virtualization techniques to instantiate a plurality of user-space instances (e.g., instances of applications). User-space instances provide isolated environments in which underlying applications are run. In some cases, user-space instances provide remote access (e.g., via external networks 106) to various services and resources. More generally, though, the isolated environments in which user-space instances execute limit the damage (e.g., loss of data, interruption of service, etc.) that an application executing in a respective user-space instance can cause to the computer system in which it is executing, and to other computer systems coupled to the same network.

In some embodiments, the one or more external networks 106 include a public communication network (e.g., the Internet and/or a cellular data network), a private communications network (e.g., a private LAN or leased lines), or a combination of such communication networks. In some embodiments, the one or more local networks 104 and external networks 106 use the HyperText Transport Protocol (HTTP) and the Transmission Control Protocol/Internet Protocol (TCP/IP) to transmit information between devices or systems. HTTP permits client devices to access various resources and services available via the one or more external networks 106 (e.g., services provided by the computer systems 102. In some embodiments, the one or more local networks 104 are, or include, wireless communications channels based on various custom or standard wireless communications protocols (e.g., IEEE 802.11 Wi-Fi), or any other suitable communication protocol, including communication protocols not yet developed as of the filing date of this document. Alternatively, in some embodiments, at least a portion of the one or more local networks 104 comprise physical interfaces based on wired communications protocols (e.g., Ethernet, USB, etc.). Although all devices are illustrated as being interconnected through local network 104, in some implementations, two or more of the aforementioned devices or systems are communicably connected with each other directly (i.e., device-to-device). The various embodiments of the invention are not limited to the use of any particular communication protocol.

In some embodiments, one or more third-party systems, client devices, and/or other electronic devices (not shown) connect to one or more of the computer systems 102 through external networks 106 in order to access resources or services hosted by the computer systems 102 (e.g., web applications provided by user-space instances). In some embodiments, a respective third-party system is a single computing device such as a computer server, while in other embodiments, the third-party system is implemented by multiple computing devices working together to perform the actions of a server system (e.g., cloud computing).

Client devices are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the one or more computer systems 102. Users employ client devices to access computer systems 102 and to access services provided by computer systems 102. For example, one or more client devices execute web browser applications that can be used to access services provided by one or more of computer systems 102. As another example, one or more of the client devices execute software applications that are specific to a service provided by the one or more computer systems 102 (e.g., service "apps" running on smart phones or tablets, such as an iPhone, Android, or Windows smart phone or tablet).

FIG. 1B is a block diagram illustrating multiple user-space instances instantiated within an exemplary computing network, in accordance with some embodiments. As a non-limiting example, FIG. 1B illustrates multiple computer systems 102 (e.g., 102-1, 102-2, . . . 102-n) communicably connected via local network 104 (e.g., Local Area Network). Each computer system 102 has a respective host operating system 310 (e.g., 310-1, 310-2, . . . 310-n) and hardware layer 108 (e.g., 108-1, 108-2, . . . 108-n). Hardware layers 108 include one or more respective processors 302 (e.g., 302-1, 302-2, . . . 302-n), memory 306 (e.g., 306-1, 306-2, . . . 306-n), and other optional hardware components (e.g., network interfaces, not shown). Processors 302 are sometimes called or known as hardware processors, CPUs, microprocessors or the like. One or more host applications 344 (e.g., 344-1, 344-2, . . . 344-n) are executed within each host operating system 310 in some embodiments. As described in greater detail below, by implementing one or more virtualization techniques, user-space instances 110 are instantiated within respective host operating systems 310 by a respective instance engine 314, providing access to various resources and services through their underlying applications.

In the non-limiting example shown, user-space instances 110 (e.g., 110-1-1, 110-1-2, . . . 110-1-m; 110-2-1, 110-2-2, . . . 110-1-q; 110-3-1, 110-3-2, . . . 110-1-p) (sometimes referred to as containers, software containers, or application instances) are instantiated using operating-system-level virtualization in which the kernel of a respective host operating system 310 allows the instantiation and management of isolated user-space instances 110. User-space instances 110 run in user space atop the kernel of a respective host operating system 310, and each user-space instance 110 has an isolated user space such that multiple user-space instances 110 may be run on a given host computer system 102. Using any variety of isolation features supported by a host operating system 310 (e.g., process isolation, resource isolation, etc.), each user-space instance 110 is allocated a respective portion of system resources (e.g., CPU, memory, block I/O, network, etc.) and respective processes are isolated (e.g., use separate address spaces, often called virtual address spaces, in virtual memory), thereby achieving an isolated view of the operating environment for each user-space instance.

Figure 1C:
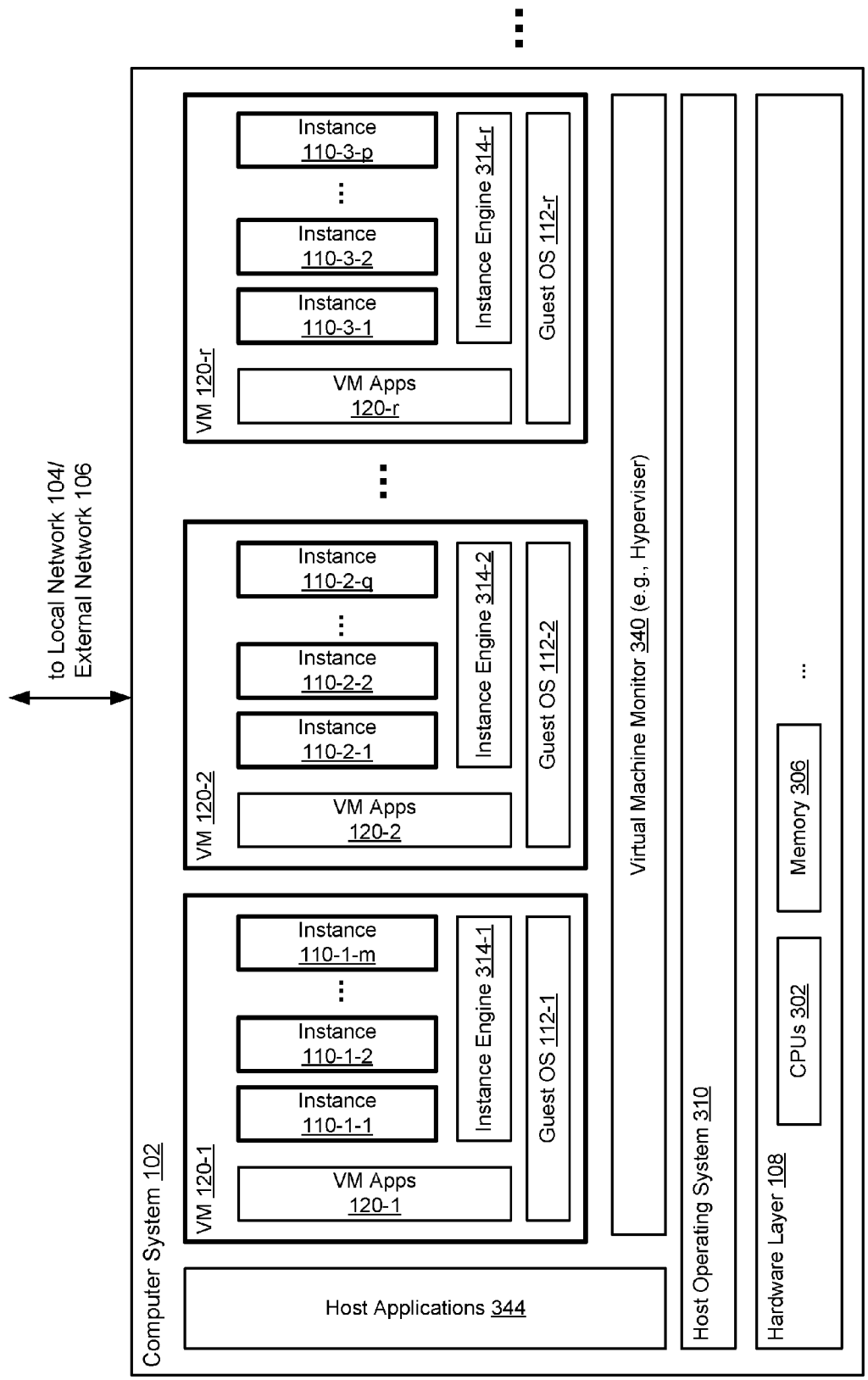
FIG. 1C is a block diagram illustrating multiple user-space instances, instantiated within virtual machines in an exemplary computing network, in accordance with some embodiments.

In contrast to other virtualization techniques (such as platform virtualization, as described in greater detail with respect to FIG. 1C), user-space instances 110 in an operating-system-level virtualization scheme communicate directly with their respective host operating systems 310 via an instance engine 314 in order to access respective processes and system resources allocated to the user-space instances 110. That is, user-space instances 110 do not emulate separate hardware layers and operating systems within their underlying host operating system 310, and instead rely on the services provided by the kernel of the host operating system 310.

In some embodiments, one or more of the following are specified for or included within each user-space instance 110: users/groups with varying levels of access (e.g., administrators, limited-access users, etc.), IP addresses, processes, files, file systems, application files, libraries, configuration files, or any combination thereof. In some implementations, applications, libraries, or any files for a user-space instance 110 are only compatible with the respective operating system 310 within which the user-space instance 110 is instantiated (e.g., host operating system 310 is a Linux platform, and user-space instance 110 includes application files that are only Linux compatible).

Instance engines 314 (e.g., 314-1, 314-2, . . . 314-n) implement a variety of techniques for instantiating and managing user-space instances 110. In some implementations, instance engines 314 employ a variety of techniques for isolating user-space instances 110 processes and allocating system resources to user-space instances 110. In particular, during instantiation, user-space instances are isolated by assigning each respective user-space instance a distinct virtual address space in virtual memory of the respective operating system environment (e.g., host operating system 310), where the respective virtual address spaces of the user-space instances are distinct from a kernel address space of the virtual memory.

In some embodiments, instance engines 314 perform process isolation to enable processes and operations for one or more underlying applications of a user-space instance 110 to be isolated from those other applications (e.g., host applications 344), user-space instances 110, and operating system processes (e.g., host operating system 310) running on a respective computer system 102. In some implementations, process isolation includes features for managing and isolating segments of process trees (e.g., separating process trees into isolated segments for user-space instances), network access (e.g., network interfaces, ports, and/or protocols usable by the user-space instances), inter-process communications (IPC) (e.g., access between applications, user-space instances, and/or OS processes), instance identifier information (e.g., isolating kernel and version identifiers), and file access privileges. A non-limiting example of a process isolation technique is the "namespaces" kernel feature supported by some Linux platforms.

In some embodiments, instance engines 314 perform resource allocation and isolation to allocate a limited portion of available system resources to a given user-space instance 110 (e.g., setting maximum memory allocation for a given user-space instance). System resources include hardware resources such as processing bandwidth (e.g., CPU), memory (e.g., RAM, storage, etc.), file/block I/O throughput, and network resources. A non-limiting example of a resource isolation technique is the "cgroups" kernel feature supported by some Linux systems.

Figure 3A:
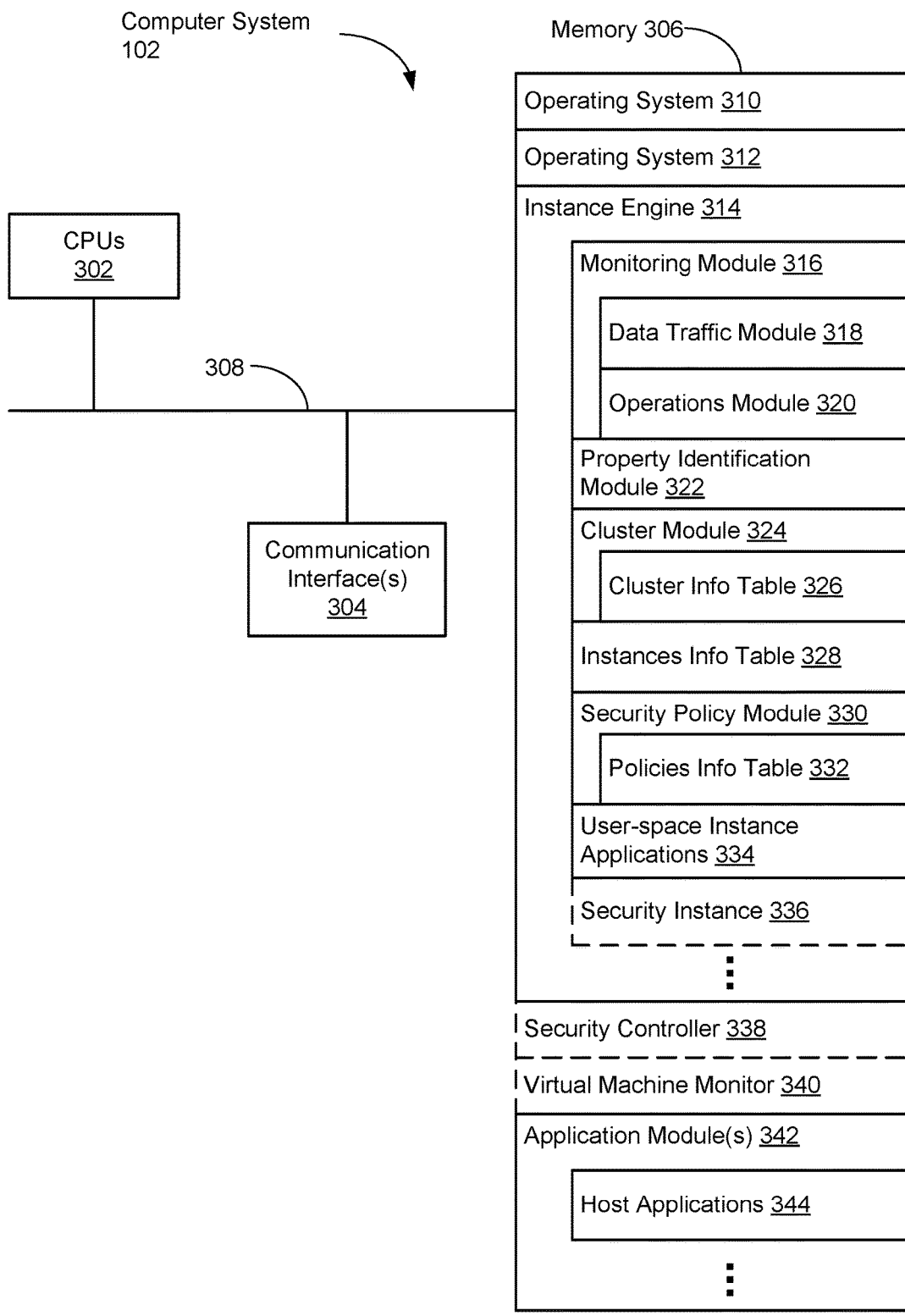
FIG. 3A is a block diagram illustrating an exemplary computer system, in accordance with some embodiments.
Figure 3B:
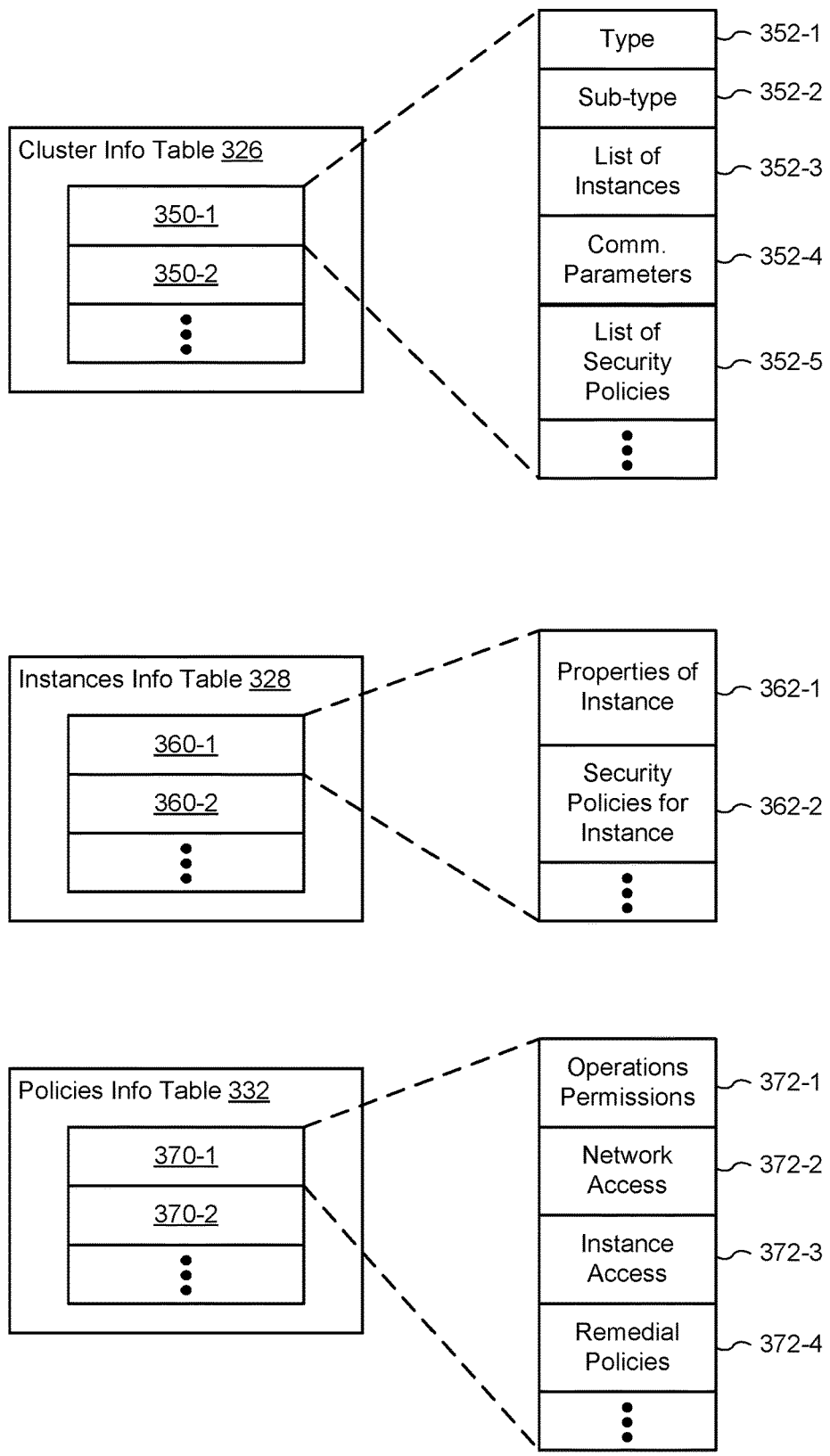
FIG. 3B illustrates exemplary data structures that store information for clusters, instances, and security policies, in accordance with some embodiments.

In some embodiments, properties characterizing user-space instances (e.g., process/resource isolation details discussed above, and/or other user-space instance properties, such as type, sub-type, etc., described in greater detail elsewhere in this document) are stored in one or more data structures (e.g., cluster info table 326 and/or instances info table 328, FIGS. 3A-3B).

Instance engines 314 perform a variety of functions for managing and providing resources to user-space instances 110. In some embodiments, instance engines 314 monitor operations (e.g., application processes) and/or data communications (e.g., data sent to and/or from other user-space instances, external networks 106, etc.) by respective user-space instances 110. Properties of user-space instances may be identified from the monitored operations and data communications (e.g., applying packet inspection techniques). In some implementations, identified properties are used to form clusters of user-space instances 110 (e.g., for user-space instances sharing common properties, as described in greater detail elsewhere in this document). Furthermore, based on the identified properties, respective sets of security policies for the user-space instances (and optionally, for their corresponding clusters) are identified and applied to their operations and/or data communications. Accordingly, instance engines 314 are configured to detect and/or remediate violations of the identified sets of security policies. In some embodiments, security policies are stored in the instance engines 314 as one or more data structures (e.g., policies information table 332, FIG. 3A). Various management and security features are discussed in greater detail elsewhere in this document, and a non-limiting example is described with respect to FIGS. 2A-2B.

FIG. 1C is a block diagram illustrating multiple user-space instances instantiated within virtual machines in an exemplary computing network, in accordance with some embodiments. As a non-limiting example, FIG. 1C illustrates a computer system 102 having a host operating system 310 and hardware layer 108, which includes one or more respective processors 320, memory 306, and other optional hardware components (e.g., network interfaces, not shown). As shown, multiple virtual machines 120 (e.g., 120-1, 120-2, . . . 120-r) are implemented within the computer system 102 by a virtual machine monitor 340 using one or more virtualization techniques, each of the virtual machines 120 emulating a respective guest operating system 112 (e.g., 112-1, 112-2, . . . 112-r). As discussed below, in combination with the operating-system-level virtualization techniques described with respect to FIG. 1B, multiple user-space instances 110 may then be instantiated within the operating system environment provided by respective host operating system 310.

In the non-limiting example shown, virtual machines 120 are instantiated using platform virtualization (also referred to as hardware virtualization). In particular, virtual machine monitor 340 (sometimes referred to as a hypervisor) instantiates and manages the virtual machines 120. In some embodiments, each virtual machine 120 includes an emulated hardware layer on top of which a guest operating system 112 is run. Guest operating systems 112 communicate with the underlying host computer system 102 through virtual machine monitor 340.

As a result of isolating the virtual machines 120 and their emulated guest operating systems 112 from one another (and from the host operating system 310), a plurality of different environments supporting different underlying system platforms (e.g., operating systems) may be executed on the same physical computer system 102. By further employing operating-system-level virtualization (according to the various embodiments described in this document) in conjunction with platform virtualization, a single computer system 102 is able to support user-space instances 110 having various platform compatibilities.

In some systems employing both operating-system-level and platform virtualization, security functionality is provided and managed for user-space instances 110 across distinct virtual machines 120 of one or more computer systems 102. For example, in some implementations, one or more of the instance engines 314 monitor operations performed by the user-space instances 110, and/or data communications between user-space instances 110 instantiated in distinct virtual machines 120 (e.g., communications between a respective user-space instance 110 on virtual machine 120 and a respective user-space instance 110 on virtual machine 120). Furthermore, in some embodiments that implement platform virtualization, clusters are formed from user-space instances 110 from distinct virtual machines 120. Various management and security features are discussed in greater detail below.

Figure 2A:
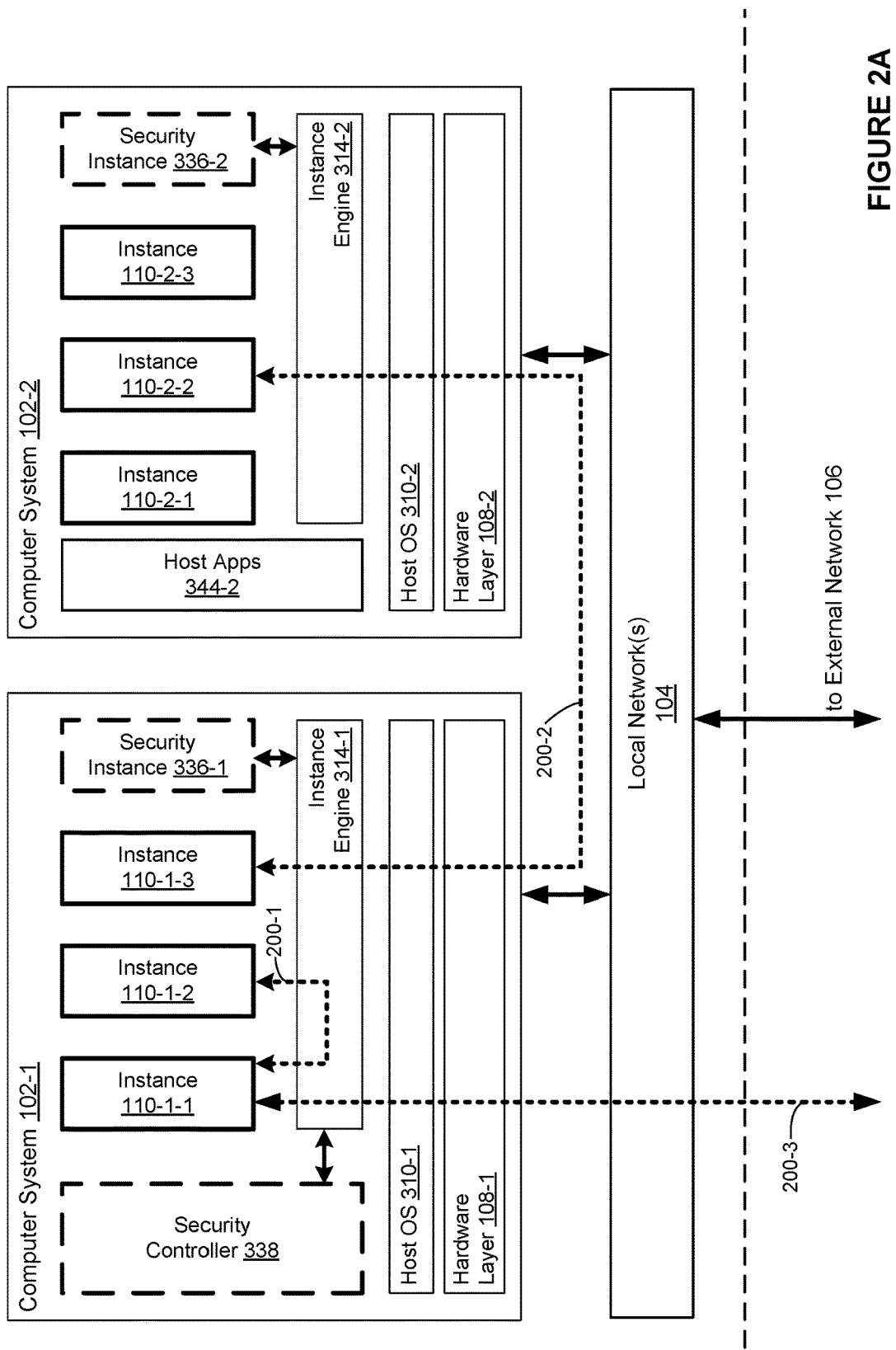
FIGS. 2A-2B illustrate an application of security policies to user-space instances of a computing network, in accordance with some embodiments.
Figure 2B:
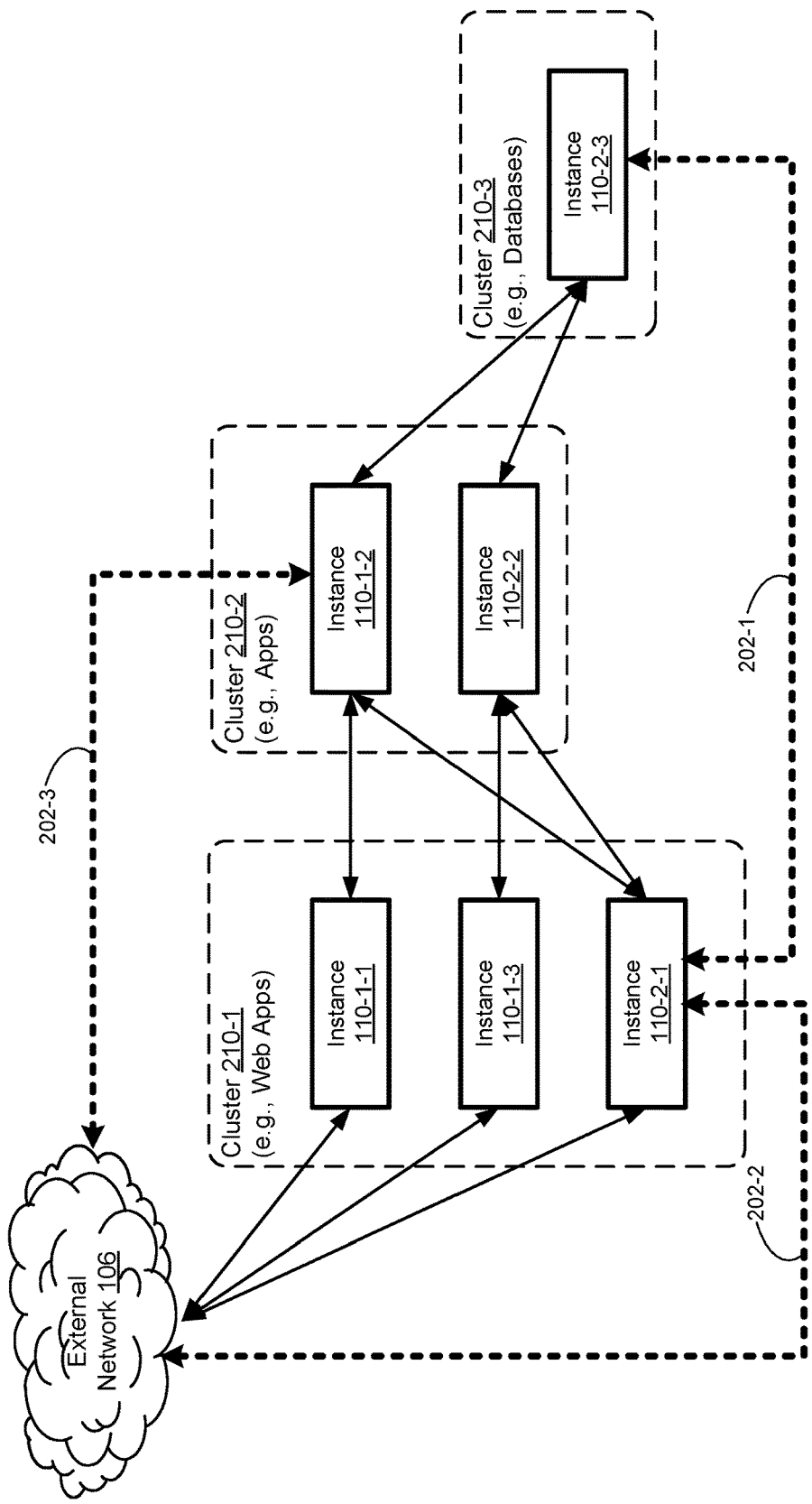

FIGS. 2A-2B illustrate an application of security policies to user-space instances of a computing network, in accordance with some embodiments. In particular, FIGS. 2A-2B provide a non-limiting example in which security policies are identified and applied to data communications and operations of user-space instances 110 in a computing network.

Referring to FIG. 2A, computer systems 102-1 and 102-2 are communicably connected via local network 104 (e.g., a Local Area Network). Computer systems 102 have respective host operating systems 310 (e.g., 310-1 and 310-1) and hardware layers 106 (e.g., 106-1 and 106-2, which include one or more respective processors 302, memory 306, and other optional hardware components). An instance engine 314 (e.g., 314-1 and 314-2) runs on each of the computer systems 102, instantiating and managing a corresponding set of user-space instances 110 (e.g., user-space instances 110-1-1 through 110-1-3 and security instance 336-1 are instantiated by instance engine 314-1 on computer system 102-1, and user-space instances 110-2-1 through 110-2-3 are instantiated by instance engine 314-2 on computer system 102-2). In the example shown, user-space instances 110 are instantiated using operating-system-level virtualization (as described with respect to FIGS. 1B and 1C, and elsewhere in this document). Here, an optional security controller 338 and security instances 336 (e.g., 336-1 and 336-2) are used in addition and/or as alternatives to the instance engine 314, in order to provide security for the user-space instances 110, as described in greater detail below.

User-space instances 110 may be configured to transmit and receive data to and from a variety of sources. As shown, transmission pathways 200 (e.g., 200-1 through 200-3) represent possible data communications channels established between user-space instances 110, and/or between user-space instances 110 and other devices (e.g., devices within or connected to an external network 106). The illustrated pathways 200 and the entities for which they provide a communication channel are only examples, and in other embodiments, additional or fewer pathways 200 exist between any combination of the user-space instances and optional devices.

In some embodiments, user-space instances 110 transmit and receive data to and from other user-space instances 110 within the same computer system 102 (e.g., via transmission pathway 200-1, user-space instance 110-1-2 transmits data to and retrieves data from user-space instance 110-1-2). In some embodiments, user-space instances 110 on one computer system 102 transmit and receive data to and from user-space instances 110 instantiated on one or more other computer systems 102 (e.g., via transmission pathway 200-2, user-space instance 110-1-3 instantiated on computer system 102-1 exchanges data with user-space instance 110-2-2 instantiated on computer system 102-2). The one or more other computer systems 102 may be within the same local network 104 or a different network (not shown). Furthermore, in some embodiments, user-space instances 110 transmit and receive data to and from devices, applications, and/or user-space instances 110 from an external network 106 (e.g., via transmission pathway 200-3, client devices in external network 106 access applications provided by user-space instance 110-1-1).

Data communications of user-space instances 110 across the various transmission pathways 200 are coordinated by one or more components of computer systems 102. For example, in some implementations, a single instance engine 314 manages direct data communications between the user-space instances 110 that it instantiates (e.g., instance engine 314 receives data from user-space instance 110-1-1 and transmits the received data to user-space instance 110-1-2).

In some embodiments, instance engine 314 coordinates with its host operating system 310 and one or more components of the hardware layer 108 to manage data communications between user-space instances 110 instantiated within different computer systems 102. As an example, for data communications between user-space instances 110-1-3 and 110-2-2, the instance engine 314-1 receives data from user-space instance 110-1-3 and coordinates with the host operating system 310-1 and network interfaces of the hardware layer 108-1 to transmit the data to computer system 102-2. Once received, the instance engine 314-2 provides the data to user-space instance 110-2-2.

In some embodiments, instance engine 314 coordinates with its host operating system 310 and one or more components of the hardware layer 108 to manage data communications between user-space instances 110 and devices in (or coupled to) an external network 106. For example, after receiving data from user-space instance 110-1-1, the instance engine 314-1 coordinates with the host operating system 310-1 and network interfaces of the hardware layer 108-1 to transmit the data to a device in external network 106 (e.g., a client device accessing a web application provided by the user-space instance 110-1-1). In these implementations, data transmissions are sometimes encapsulated (e.g., based on a packet format defined by the instance engine 314) and tunneled through host operating system 310 and hardware layer 108, such that the data transmission is undecipherable by host operating system 310.

Although not illustrated, in some implementations that employ both platform virtualization (e.g., virtual machines) and operating-system-level virtualization (e.g., user-space instances), analogous transmission pathways described herein enable data communications between user-space instances 110 within the same virtual machine 120 (e.g., user-space instances 110-1-1 and 110-1-2 of virtual machine 120-1, FIG. 1C), and/or between user-space instances 110 across different virtual machines 120 (e.g., between user-space instance 110-1-1 of virtual machine 120-1, and user-space instance 110-2-1 of virtual machine 120-2, FIG. 1C).

Authorized operations and data communications for user-space instances 110 are defined by corresponding sets of security policies. As an example, a security policy defines through which transmission pathways, and/or with which user-space instances, applications, devices, and/or other processes a given user-space instance is permitted to exchange data. Security policies applied to a particular user-space instance 110 (or cluster of user-space instances 110, as discussed with respect to FIG. 2B) are identified based on properties that characterize the particular user-space instance 110 (or a cluster to which it belongs), one example of which is a user-space instance type (e.g., database applications). Various user-space instance properties used to identify applicable security policies, and the various techniques by which properties are obtained or derived, are described elsewhere in this document.

As a result of user-space instances 110 using operating-system-level virtualization, host operating systems 310 are unable to process or identify data communications of user-space instances 110. Consequently, system-level security policies (i.e., policies implemented by host operating systems 310) are sometimes unable to detect, much less remediate, unauthorized operations or communications. To overcome these potential security vulnerabilities with operating-system-level virtualization, optional security instances 336, security controllers 338, and/or instance engines 314 operate alone or in conjunction to ensure that operations and data communications of user-space instances 110 in the computing network are compliant with identified security policies.

In some implementations, security instances 336 are instantiated and configured to perform one or more security functions with respect to the operations and data communications of user-space instances 110. Because security instances 336 are instantiated by the same instance engines 314 that manage the operations and data communications of the user-space instances 110, security instances 336 are capable of monitoring, inspecting, and/or applying security policies to the operations and data communications of the user-space instances. As merely an example, security instances 336 are configured to intercept and decline further transmission of data communications between user-space instances 110 in response to detecting violations of applicable security policies.

In this example, security controller 338 is a type of host application executed on top of (i.e., in the operating environment provided by) host operating system 310. Security controller performs one or more security functions in addition to and/or alternatively to security instances 336. In other cases, security controller 338 is a separate electronic device (e.g., computer system 102, server system, etc.) communicably coupled to but distinct from the computer systems 102 on which the user-space instances are instantiated. In some implementations, security controller 338 interfaces with one or more instance engines 314 across multiple computer systems 102 to obtain information for managing (e.g., maintaining databases) and/or identifying applicable security policies (e.g., based on identified properties of user-space instances 110 obtained from the one or more instance engines 314). In some implementations, security controller 338 is tasked with performing security functions that are more resource intensive (e.g., demanding higher CPU and memory usage) in comparison the security functions performed by the security instances 336.

Various security features supported by the security instances 336, security controllers 338, and/or instance engines 314 are described throughout this document. Security features are not limited to performance by any particular computer system, system component, application, or instance. In other words, many of the security features described herein may be interchangeably performed by security instances 336, security controllers 338, and/or instance engines 314, or a combination thereof.

FIG. 2B illustrates a map of clusters formed from user-space instances 110 executed in one or more computer systems or a distributed system (e.g., distributed system 100), in accordance with some embodiments. Particularly, the cluster map shows clusters formed from the user-space instances 110 in the computer network of FIG. 2A.

A cluster map provides both a logical grouping of user-space instances 110 into distinct clusters 210, and the functional relationships between the clusters 210 and their constituent user-space instances 110. As described in greater detail below, in some implementations, the security policies applied to a particular user-space instance 110 are identified, at least in part, based on the cluster to which it belongs. More specifically, according to some embodiments, the one or more common properties of the user-space instances within the corresponding cluster are used to identify a corresponding set of security policies to apply to all or some of the user-space instances of the cluster. In doing so, at least some security policies need not be individually managed for each user-space instance and can be consolidated for user-space instances sharing overlapping properties. Security is therefore more efficiently and effectively applied in computing environments that implement some form of virtualization.

Clusters 210 are formed based on one or more properties that characterize the user-space instances 110. Properties include, for example, a user-space instance type (e.g., web application, database application, etc.) and predefined access controls (e.g., permitted access to Internet). Here, user-space instances 110 are logically grouped into distinct clusters 210, where the clusters 210 are formed based on at least user-space instance types. Specifically, cluster 210-1 is a cluster for web application user-space instances (e.g., 110-1-1, 110-1-3, and 110-2-1), cluster 210-2 is a cluster for other application user-space instances (e.g., 110-1-2 and 110-2-2), and cluster 210-3 is a cluster for database user-space instances (e.g., 110-2-3). At least some of the clusters 210 are also formed based on their predefined access controls. For example, as shown in FIG. 2B, cluster 210-1 includes user-space instances 110 that are permitted to access external network 106.

In some implementations, after the clusters 210 have been formed, properties associated with each of the clusters 210 are then used to identify respective sets of security policies for the clusters 210 (e.g., from one or more predefined tables, such as cluster info table 326 and policies info table 332, FIGS. 3A and 3B). As an example, properties for a cluster 210 are matched against entries of a cluster info table 326. Once a matching entry has been located, one or more security policies (or references to security policies) are identified from the matching entry (e.g., one or more index values that point to entries of a policies info table 332, FIGS. 3A and 3B). The identification of applicable security policies is analogously performed in cases in which clusters 210 are not formed (e.g., one or more properties of user-space instances 110 are identified, and applicable security policies are identified using the cluster info table 326 and the policies info table 332 based on the one or more properties, wherein the cluster info table 326 additionally and/or alternatively includes entries corresponding to individual user-space instances 110).

Each of the identified sets of security policies is then applied to a corresponding cluster 210 so that any violations in monitored operations and/or data communications of user-space instances 110 for the cluster 210 are detected and remediated. Examples of such violations are shown in FIG. 2B.

In one example, via transmission pathway 202-1, user-space instance 110-2-1 attempts to retrieve data from user-space instance 110-2-3, even though such access by any of the user-space instances 110 of cluster 210-1 would violate a corresponding set of security policies for cluster 210-1. The access attempt by user-space instance 110-2-1, which violates applicable security policies for cluster 210-1, may, for example, be a result of malicious software having compromised user-space instance 110-2-1 or user-space instance 110-2-3. Here, a remedial action is performed to prevent transmission of data from user-space instances of cluster 210-3 to user-space instance 110-2-1.

In the example described above, prior to any remedial action being taken, user-space instance 110-2-1 retrieves unauthorized data from user-space instance 110-2-3 and attempts to transmit the unauthorized data to an external network 106 via transmission pathway 202-2. Transmission pathway 202-2 may correspond to transmissions via an unauthorized network port as indicated by corresponding security policies for cluster 210-1. The access attempt therefore constitutes a security violation, which may be a result of malicious software that has compromised user-space instance 110-2-1. Here, a remedial action is performed to deny transmissions of data from user-space instance 110-2-1 to devices in an external network 106 (e.g., disabling the port through which the transmission attempt was detected).

In another example, transmission pathway 202-3 represents an unknown device (not shown) from an external network 106 attempting to access user-space instance 110-1-2. Alternatively, transmission pathway 202-3 represents an unauthorized attempt by the user-space instance 110-1-2 to access an external network 106. Here, security policies indicate that user-space instances of cluster 210-2 are not permitted to access and/or may not be accessed by devices of an external network 106, as illustrated by user-space instances 110-1-2 and 110-2-2 being accessible by and/or having access to only user-space instances within the local network. Accordingly, a violation of the corresponding security policies for cluster 210-2 is detected and a remedial action is performed to deny access to user-space instances 110-1-2 and 110-2-2 by the external network 106, and/or access to the external network 106 by user-space instances 110-1-2 and 110-2-2.

Other examples of security policies and their application are described in greater detail elsewhere in this document.

FIG. 3A is a block diagram illustrating an exemplary computer system 102, in accordance with some embodiments. The computer system 102 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The computer system 102 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 310 that includes procedures for handling various basic system services and for performing hardware dependent tasks;
- a network communication module 312 that is used for connecting the computer system 102 to other computer systems or devices via one or more communication network interfaces 304 (wired or wireless) and one or more communication networks (e.g., local networks 104, external networks 106, etc.)
- an instance engine 314 for instantiating, managing, and providing security for user-space instances 110, which includes:
  - a monitoring module 316 for monitoring activity of user-space instances 110, which includes:
    - a data traffic module 318 for monitoring data communications to and from user-space instances 110; and
    - an operations module 320 for processes and operations of user-space instances 110;
  - a property identification module 322 for identifying and storing properties that characterize user-space instances 110 (e.g., user-space instance type/sub-type, access controls, network parameters, etc.)
  - a cluster module 324 for forming clusters from user-space instances 110 (e.g., based on common properties), which includes:
    - a cluster info table 326 for storing entries of cluster information (e.g., properties of clusters/constituent user-space instances, corresponding sets of security policies, etc.);
  - an instances info table 328 for storing entries of user-space instance information (e.g., properties of particular user-space instances, corresponding sets of security policies for particular user-space instances, etc.);
  - a security policy module 330 for identifying (e.g., based on identified properties), maintaining, and (optionally) applying security policies for operations and/or data communications of user-space instances, which includes:
    - a policies info table 332 for storing sets of security policies (e.g., authorized/unauthorized operations and/or data communications, remedial actions, etc.);
  - one or more user-space instance applications 334, which include application files, configuration data, and other information for instantiating user-space instances 110;
  - a security instance 336, sometimes called a security user-space instance, for performing one or more functions with respect to user-space instance security (e.g., applying identified security policies to operations and/or data communications of user-space instances 110);
- a (optional) security controller 338 for performing one or more functions with respect to user-space instance security (e.g., consolidating data received from other instance engines 314, security instances 336, etc.; using consolidated data to form clusters, identify security policies, apply security policies, etc.);
- a (optional) virtual machine monitor 340 for virtualizing and managing virtual machines 120 (FIG. 1C); and
- one or more application modules 342, which include:
  - host application modules 344 for performing various functions of the computer system 102 (e.g., applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, etc.).

Although FIG. 3A shows a "computer system," FIG. 3 is intended more as functional description of the various features that may be present in a set of computer systems 102 than as a structural schematic of the implementations described herein. In practice, and as recognized by those of ordinary skill in the art, items shown separately could be combined and some items could be separated. For example, some items shown separately in FIG. 3 could be implemented on single computer systems and single items could be implemented by one or more computer systems. The actual number of computer systems and how features are allocated among them will vary from one implementation to another, and may depend in part on the amount of data traffic that the system must handle during peak usage periods as well as during average usage periods.

Each of the above identified elements may be stored in one or more of the previously mentioned memory devices of computer system 102, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

FIG. 3B illustrates exemplary data structures that store information for clusters, instances, and security policies, in accordance with some embodiments. In particular, FIG. 3B illustrates the cluster info table 326, instances info table 328, and policies info table 332 stored in memory 306 of computer system 102, as shown in FIG. 3A. Each of the tables includes a plurality of entries, each of which includes one or a plurality of fields.

In some implementations, entries 350 (e.g., 350-1, 350-2, ...) of the cluster info table 326 include respective information for clusters of user-space instances 110. Fields 352 of the cluster info table 326 include properties of user-space instances, at least some of which are common to multiple user-space instances of a cluster (or characteristic to one user-space instance of the cluster). Properties include, but are not limited to: user-space instance type 352-1 (e.g., database applications), a user-space instance sub-type 352-2 (e.g., Cassandra databases), a list of user-space instances composing a respective cluster for the entry 352-3 (e.g., user-space instances 110-1-1, 110-1-3, and 110-2-1 forming cluster 210-1, FIG. 2B), network communication parameters (e.g., network communications protocol, network communications port, etc.), and a list of security policies (e.g., list of authorized and unauthorized operations and/or data communications, or references to security policies in policies info table 332). Other user-space instance properties that may be included in the cluster info table 326 are described elsewhere in this document.

In some implementations, entries 360 (e.g., 360-1, 360-2, . . . ) of the instances info table 328 include respective information for particular user-space instances, such as properties 362-1 of a particular user-space instance, and corresponding security policies 362-2 for the particular user-space instance.

In some implementations, entries 370 (e.g., 370-1, 370-2, . . . ) of policies info table 332 correspond to rules defining authorized and unauthorized operations and/or data communications of user-space instances (individually, or of a cluster). Security policies may be defined with respect to one or more aspects of user-space instance operations and data communications, such as: operations permissions 372-1 (e.g., permissible processes, routines, and/or commands; limits on resource usage; etc.), network access 372-2 (e.g., Internet access), instance access 372-3 (e.g., accessible user-space instance types/sub-types), and/or remedial policies 372-4 (e.g., terminate violating instance). Various example of security policies are described elsewhere in this document.

FIGS. 4A-4D are flow diagrams illustrating a method of 400 applying security policies in a virtualization environment, in accordance with some embodiments. At least in some implementations, the method 400 is performed by one or more electronic devices of a computing network (e.g., computer systems 102, FIGS. 1A-1C, 2A-2B, and 3A-3B) or one or more components thereof (e.g., security instances 336, security controller 338, and/or instance engine 314, FIG. 2A). For ease of reference, the methods herein will be described as being performed by an electronic device (e.g., computer system 102-1). In some embodiments, method 400 is governed by instructions that are stored in a non-transitory computer readable storage medium and that are executed by one or more processors of an electronic device, such as the one or more processors 302 of computer system 102, as shown in FIG. 3A.

An electronic device instantiates (402) a plurality of user-space instances. Each respective user-space instance of the plurality of user-space instances is (404) instantiated within a respective operating system environment (e.g., user-space instances 110-1-1 through 110-1-3 are instantiated within host operating system 310-1 of computer system 102-1, FIG. 2A). Each respective user-space instance has a distinct virtual address space in virtual memory of the respective operating system environment. The respective virtual address spaces of the user-space instances are (404) distinct from a kernel address space of the virtual memory.

In some embodiments, instantiating includes (408) instantiating the plurality of the user-space instances within a first operating system environment of a first virtual machine (e.g., user-space instances 110-1-1 through 110-1-q instantiated within guest operating system 112-1 of virtual machine 120-1, FIG. 1C). In some implementations, a first subset of the plurality of user-space instances is instantiated within a first operating system environment of a first virtual machine (e.g., user-space instances 110-1-1 through 110-1-q instantiated within guest operating system 112-1 of virtual machine 120-1, FIG. 1C), and a second subset of the plurality of user-space instances distinct from the first subset is instantiated within a second operating system environment of a second virtual machine distinct from the first virtual machine (e.g., user-space instances 110-2-1 through 110-2-q instantiated within guest operating system 112-2 of virtual machine 120-2, FIG. 1C). In alternative embodiments, each of the plurality of the user-space instances is instantiated within an operating system environment of a single virtual machine.

Figure 4A:
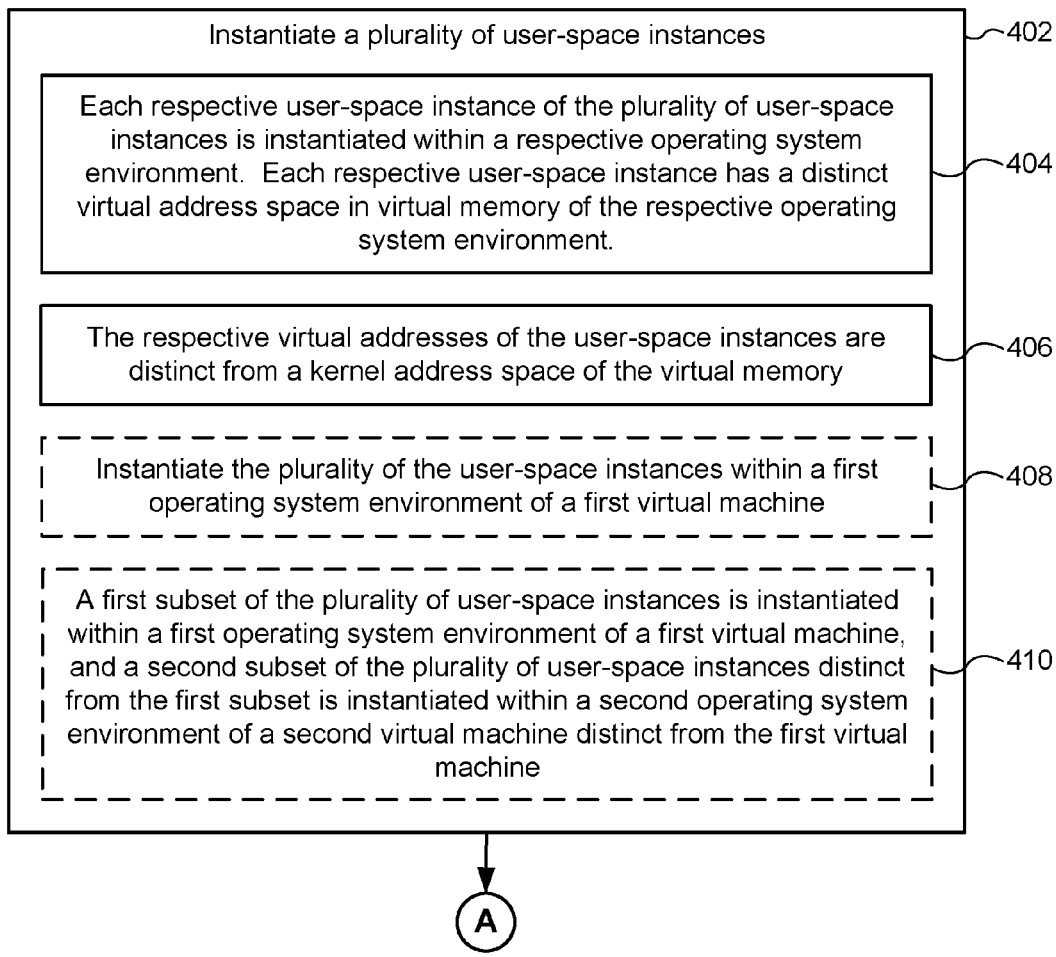
FIGS. 4A-4D are flow diagrams illustrating a method of applying security policies in a virtualization environment, in accordance with some embodiments.
Figure 4B:
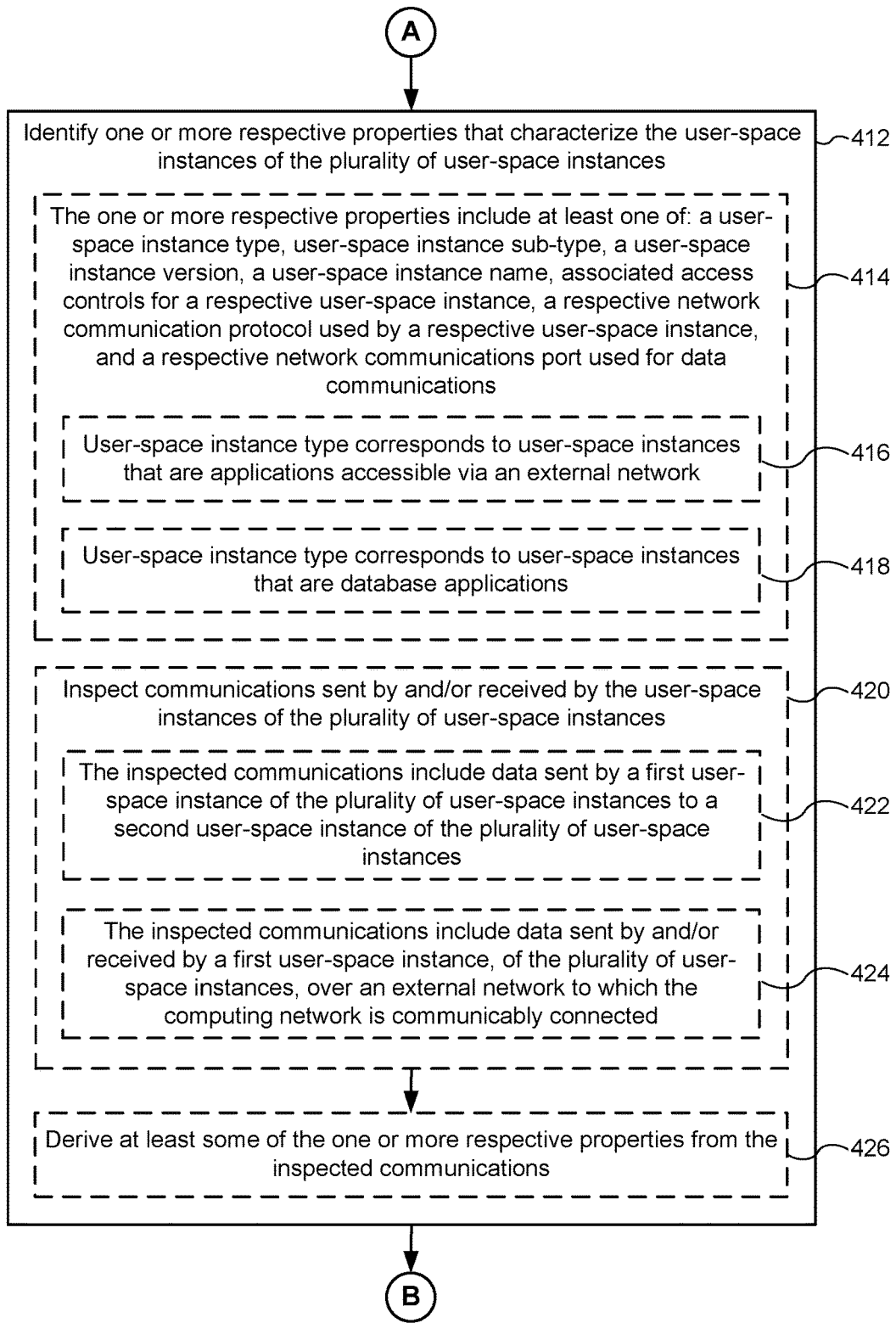

Referring now to FIG. 4B, the electronic device (e.g., instance engine 314, FIG. 2A) identifies (412) one or more respective properties that characterize the user-space instances of the plurality of user-space instances. As described in detail below (with respect to FIG. 4C), in some implementations, the one or more respective properties identified for the user-space instances are used to form clusters of user-space instances and to identify applicable sets of security policies to be applied to operations and data communications of the user-space instances.

The one or more respective properties include (414) at least one of: a user-space instance type (e.g., web applications, database applications, etc.), a user-space instance sub-type (e.g., a specific application, such as a Cassandra database), a user-space instance version, a user-space instance name (e.g., instance identifier), associated access controls for a respective user-space instance (e.g., access to or accessible by an external network 106), a respective network communication protocol used by a respective user-space instance (e.g., HTTPS), and a respective network communications port used for data communications (e.g., port 443 for HTTPS). In some implementations, properties include a compatible operating system for an application of a respective user-space instance (e.g., a particular Linux build, sometimes called a Linux distribution, for a particular application).

In some implementations, a particular user-space instance type corresponds (416) to user-space instances that are applications accessible via an external network (e.g., user-space instances 110-1-1, 110-1-3, and 110-2-1 corresponding to web applications, FIG. 2B). In some implementations, a particular user-space instance type corresponds (418) to user-space instances that are database applications (e.g., user-space instance 110-2-3, corresponding to a database application, FIG. 2B). In further implementations, the database applications corresponding to the user-space instance type do not have direct access to an external network (e.g., databases are not authorized to access the Internet).

In some implementations, associated access controls are predefined (e.g., configured by a user prior to or at time of instantiation, defined by default rules associated with respective user-space instance types and/or sub-types, etc.) or not explicitly defined (e.g., no express permission provided or defined). Associated access controls include permissions for accessing or being accessible by external networks (e.g., permissions indicating that web application user-space instance 110 is accessible by client devices in an external network 106, FIG. 1A), other user-space instances (e.g., permissions indicating that user-space instances 110 are allowed to access other user-space instances 110 in the same or a different computer system 102, virtual machine 120, local network 104, etc.), and/or end-users (e.g., permissions indicating that specified users or groups of users of client devices are allowed to access services provided by user-space instances 110).

In some embodiments, identifying the one or more respective properties includes (420) inspecting communications sent by and/or received by the user-space instances of the plurality of user-space instances, and (426) deriving at least some of the one or more respective properties from the inspected communications. Any of a variety of techniques may be implemented for inspecting data communications and deriving user-space instance information (e.g., properties). In some embodiments, the inspected communications include data packets, each comprising a respective header portion and a respective data portion. Furthermore, inspecting the communications includes inspecting at least the data portions of the data packets. These embodiments are sometimes referred to as methods for deep packet inspection (DPI).

In some implementations, the inspected communications include (422) data sent by a first user-space instance of the plurality of user-space instances to a second user-space instance of the plurality of user-space instances (e.g., data communications exchanged between user-space instances 110-1-1 and 110-1-2 via transmission pathway 200-1, FIG. 2A). In some embodiments, the first user-space instance is instantiated within a first operating system environment of a first virtual machine, and the second user-space instance is instantiated within a second operating system environment of a second virtual machine distinct from the first virtual machine (e.g., data communications exchanged between user-space instance 110-1-1 on virtual machine 120-1 and user-space instance 110-2-1 on virtual machine 120-2, FIG. 1C). In some embodiments, both the first user-space instance and the second user-space instance are instantiated within a first operating system environment of a first virtual machine.

In some implementations, the inspected communications include (424) data sent by and/or received by a first user-space instance, of the plurality of user-space instances, over an external network to which the computing network is communicably connected (e.g., data transmitted by user-space instance 110-1-1 to a device in external network 106 via transmission pathway 200-3, FIG. 2A).

Additionally and/or alternatively, identifying the one or more respective properties includes obtaining meta data specifying at least some of the one or more respective properties. Meta data may be obtained from any components of the computer system 102 or its virtualization environment that maintain or store meta data for user-space instances 110 (e.g., instance engine 314, security instance 336, security controller 338, and/or virtual machine monitor 340).

Figure 4C:
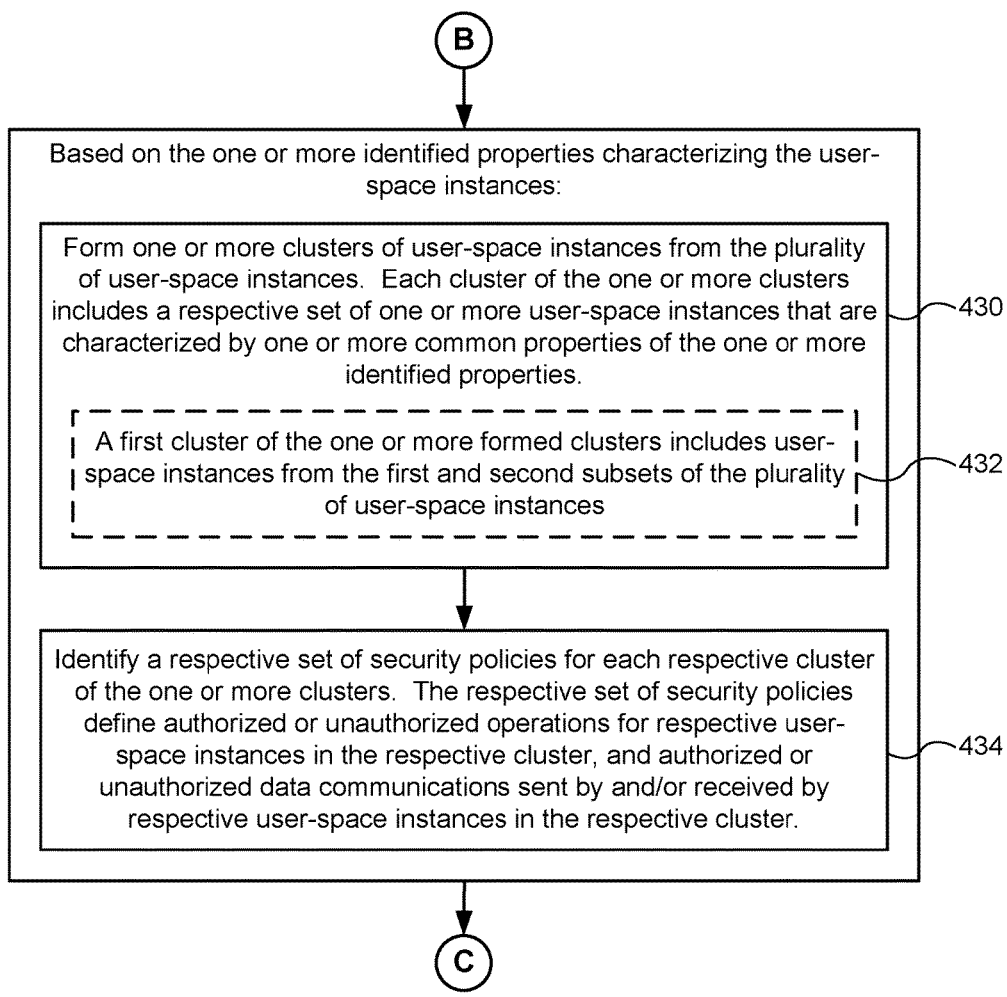

Referring now to FIG. 4C, based on the one or more identified properties characterizing the user-space instances, one or more clusters of user-space instances are formed (430) from the plurality of user-space instances (e.g., clusters 210-1 through 210-3 in FIG. 2B formed by security controller 338 in FIG. 2A). Each cluster of the one or more clusters includes a respective set of one or more user-space instances that are characterized by one or more common properties of the one or more identified properties (e.g., in FIG. 2B, cluster 210-1 includes user-space instances of the same type, namely web applications). In some implementations, a first cluster of the one or more formed clusters includes (432) user-space instances from both of the first and second subsets of the plurality of user-space instances (the first subset including user-space instances instantiated in a first virtual machine, and the second subset including user-space instances instantiated in a second virtual machine) (step 410, FIG. 4A). For example, referring to the platform virtualization embodiments described in FIG. 1C, a cluster includes user-space instance 110-1-1 from virtual machine 120-1, and user-space instance 110-2-1 from virtual machine 120-2.

After the one or more clusters have been formed, a respective set of security policies is identified (434) for each respective cluster of the one or more clusters based on the one or more identified properties characterizing the user-space instances. The respective set of security policies define authorized or unauthorized operations for respective user-space instances in the respective cluster, and authorized or unauthorized data communications sent by and/or received by respective user-space instances in the respective cluster. Security policies may be defined with respect to one or more aspects of user-space instance operations (e.g., permissible processes, routines, and/or commands; limits on resource usage; etc.) and/or data communications (e.g., accessible user-space instance types and/or sub-types). Examples of security policies and their application are described elsewhere in this document.

In some embodiments, identifying the respective set of security policies for each respective cluster includes identifying a corresponding entry for the respective cluster in a data structure, wherein the corresponding entry specifies (or alternatively provides a reference to a different source that specifies) the respective set of security policies (e.g., cluster info table 326 and/or policies info table 332, FIGS. 3A-3B). In some implementations, to identify the corresponding entry, at least some of the one or more common properties for the respective cluster are matched against one or more fields of the data structure (e.g., finding an entry that matches at least a user-instance type and network communication protocols/ports common to user-space instances for a cluster). An example is described with respect to FIG. 2B.

In additional and/or alternative embodiments (irrespective of whether forming the one or more clusters is performed), respective sets of security policies are identified for each of the plurality of user-space instances based on the one or more identified properties characterizing the user-space instances. In other words, the forming of clusters is optional for identifying security policies to apply to respective user-space instances. Furthermore, in some embodiments, respective sets of security policies are identified for only some of the one or more clusters, or for only some of the plurality of user-space instances.

In some embodiments, a first cluster includes a first subset and a second subset of user-space instances, and a first set of security policies for the first cluster includes a first subset of security policies that apply to the first subset of user-space instances, and a second subset of security policies that apply to the second subset of user-space instances. In order words, in some implementations, different but partially overlapping security policies (e.g., different and partially overlapping with respect to authorized operations and/or data communications, and/or remedial actions taken, etc.) are applied to different subsets of user-space instances in a cluster. Furthermore, in some implementations, the first subset and second subset of user-space instances correspond to first and second user-space instance sub-types of a same user-space instance type (e.g., both subsets of user-space instances correspond to database applications, but different ones). Accordingly, in some implementations, application profiles are used such that different sub-types of user-space instances within a given cluster (e.g., specific applications) have respective security policies that are applied in addition (e.g., more stringent policies than those for the cluster) or alternatively to (e.g., as exceptions to policies for the cluster) the security policies of the given cluster.

Figure 4D:
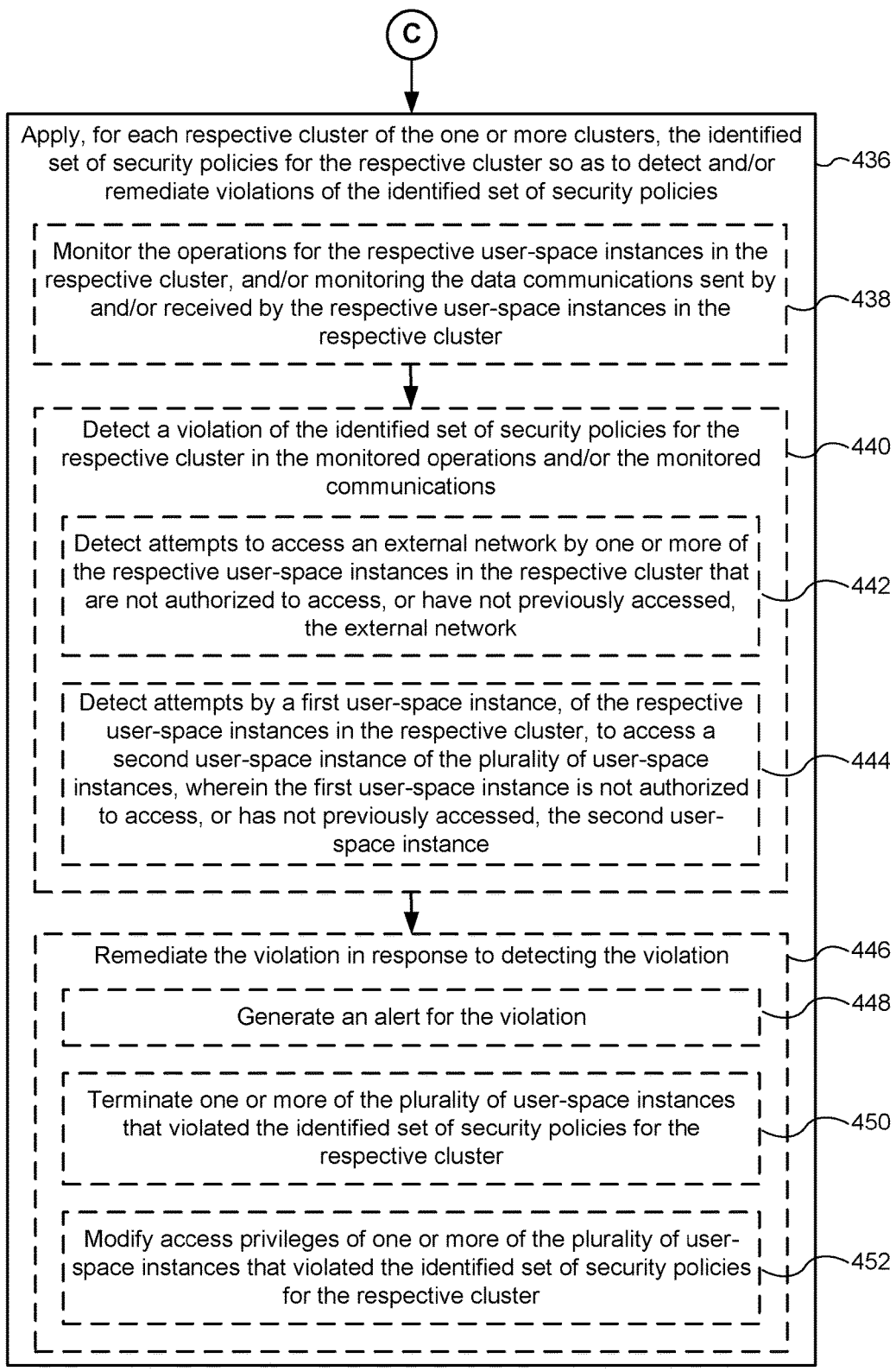

Referring now to FIG. 4D, after identifying the respective set of security policies (e.g., for each/some of the one or more clusters, for each/some of the plurality of user-space instances, etc.), the identified set of security policies for the respective cluster is applied (436) for each respective cluster (or only some) of the one or more clusters, so as to detect and/or remediate violations of the identified set of security policies. In some embodiments, identifying (step 434, FIG. 4C) the one or more respective properties and applying (436) the identified set of security policies are performed by a user-space security instance (e.g., security instance 336-1, FIG. 2A) that operates in (i.e., is executed in) user space, but is distinct from the plurality of user-space instances (e.g., instances 110, FIG. 2A) that it monitors.

In some embodiments, applying the identified set of security policies includes (438) monitoring the operations for the respective user-space instances in the respective cluster, and/or monitoring the data communications sent by and/or received by the respective user-space instances in the respective cluster. Furthermore, applying the identified set of security policies includes (440) detecting a violation of the identified set of security policies for the respective cluster in the monitored operations and/or the monitored communications, and (446) remediating the violation in response to detecting the violation.

In some embodiments, detecting the violation of the identified set of security policies includes (442) detecting attempts to access an external network by one or more of the respective user-space instances in the respective cluster that are not authorized to access, or have not previously accessed, the external network (e.g., user-space instances 110-1-2 and 110-2-2 attempting to access devices of the external network 106 via transmission pathway 202-3, as described with respect to FIG. 2B). In some cases, attempts to access the external network are unauthorized with respect to attempts to access particular devices (e.g., devices corresponding to specific addresses, users, etc.), device types (e.g., mobile devices, but not server systems), applications/processes (e.g., specific types of application), and/or devices using particular network parameters (e.g., one or more particular ranges of IP addresses, geographic regions, communication protocols, etc.).

In some embodiments, detecting the violation of the identified set of security policies includes detecting attempts to access a first user-space instance, of the respective user-space instances in the respective cluster, wherein the access attempts originate from an external network that is not authorized to access the first user-space instance (e.g., attempts by external network 106 to access user-space instance 110-1-2 via pathway 202-3, as described with respect to FIG. 2B). In some cases, attempts by the external network to access the first user-space instance are unauthorized with respect to attempts by particular devices (e.g., devices corresponding to specific addresses, users, etc.), device types (e.g., mobile devices, but not server systems), applications/processes (e.g., specific types of application), and/or devices using particular network parameters (e.g., one or more particular ranges of IP addresses, geographic regions, communication protocols, etc.).

In some embodiments, detecting the violation of the identified set of security policies includes detecting attempts by a first user-space instance, of the respective user-space instances in the respective cluster, to transmit data managed by a second user-space instance of the plurality of user-space instances to an external network. In these embodiments, the first user-space instance is authorized to access the external network, and the second user-space instance is not authorized to access the external network (e.g., user-space instance 110-2-1 attempting to transmit, via pathway 202-2 and to external network 106, data retrieved from user-space instance 110-2-3, as described with respect to FIG. 2B).

In some embodiments, detecting the violation of the identified set of security policies includes (444) detecting attempts by a first user-space instance, of the respective user-space instances in the respective cluster, to access a second user-space instance of the plurality of user-space instances, wherein the first user-space instance is not authorized to access, or has not previously accessed, the second user-space instance (e.g., user-space instance 110-2-1 attempting to access user-space instance 110-2-3 via transmission pathway 202-1, as described with respect to FIG. 2B). In some cases, attempts to access a particular user-space instance are unauthorized with respect to attempts to access particular devices (e.g., specific computer systems), a particular user-space instance (e.g., based on a unique identifier of a user-space instance), user-space instance types/sub-types (e.g., attempts to access confidential databases), network parameters (e.g., user-space instances falling within one or more particular ranges of IP addresses, user-space instances associated with one or more particular geographic regions, etc.), and/or any other properties that characterize a user-space instance (various examples of which are described elsewhere in this document).

In some embodiments, detecting the violation of the identified set of security policies includes detecting attempts by one or more of the respective user-space instances to transmit and/or receive data using unauthorized network parameters (e.g., use of modified or unpermitted network parameters, such as communications ports, communications protocol, transmission rates, etc.).

In some embodiments, detecting the violation of the identified set of security policies includes detecting resource usage by one or more of the respective user-space instances that exceeds allocated resource limits (e.g., usage limits for CPU, memory, network bandwidth, etc.). In some implementations, allocated resource limits are defined at the time of instantiation (e.g., during a resource isolation process, described with respect to FIG. 1B).

After and in response to detecting the violation of the identified set of security policies, the violation is remediated (446) (e.g., remediated by instance engines 314, security instances 336, etc., FIG. 2A). As described below, any variety of remedial actions (or combination thereof) may be taken.

In some embodiments, the remediation includes generating an alert (448) for the violation (e.g., alert is generated and presented to an administrator of the computing network). In some cases, the alert provides identifying information of the one or more user-space instances 110 that violated the identified security policies, and optionally includes (e.g., indicates, or enables an administrator/system to select execution of) remedial actions that may be taken.

In some implementations, the remediation includes terminating one or more of the plurality of user-space instances that violated the identified set of security policies for the respective cluster (450). Referring to FIG. 2B, for example, user-space instance 110-2 is terminated for unauthorized attempts to access the external network 106 (e.g., security instance 336-1 provides instructions to instance engine 314-1 to terminate user-space instance 110-2). User-space instances that violate the identified security policies may be from a corresponding cluster (i.e., cluster associated with the identified security policies) or a different cluster. Additionally or alternatively, user-space instances that are affected by, but are not the source of, the violation (e.g., compromised user-space instances or containers that did not perform an action or operation triggering the violation) are terminated so as to mitigate the extent to which security is compromised.

In some embodiments, the remediation includes modifying access privileges of one or more of the plurality of user-space instances that violated the identified set of security policies for the respective cluster (452). Referring again to FIG. 2B, for example, access privileges for user-space instance 110-2-1 (e.g., permissions and/or network parameters managed by instance engine 314-2/security instance 336-2, FIG. 2A) are modified to prevent unauthorized access to user-space instance 110-2-3 (e.g., security instance 336 provides instructions to instance engine 314 to modify access privileges for a user-space instance, which may include instructions to disconnect the user-space instance from access to external networks 106, instructions to disable communications with other components of a computer system 102/virtualization environment, such as communications with other user-space instances 110, virtual machines 120, host/guest operating systems, instance engine 314, etc.).

Separate from applying the identified set of security policies for the respective cluster, in some embodiments, a set of system-level security policies is applied to operations performed by and communications sent by and/or received by the plurality of user-space instances. The set of system-level security policies is implemented by the respective operating system environment, rather than components of or related to the virtualized environments (e.g., instance engine 314, security instance 336, and security controller 338). Examples include packet filtering rules for packets sent or received by the electronic device (and/or optional virtual machines).

Figure 5A:
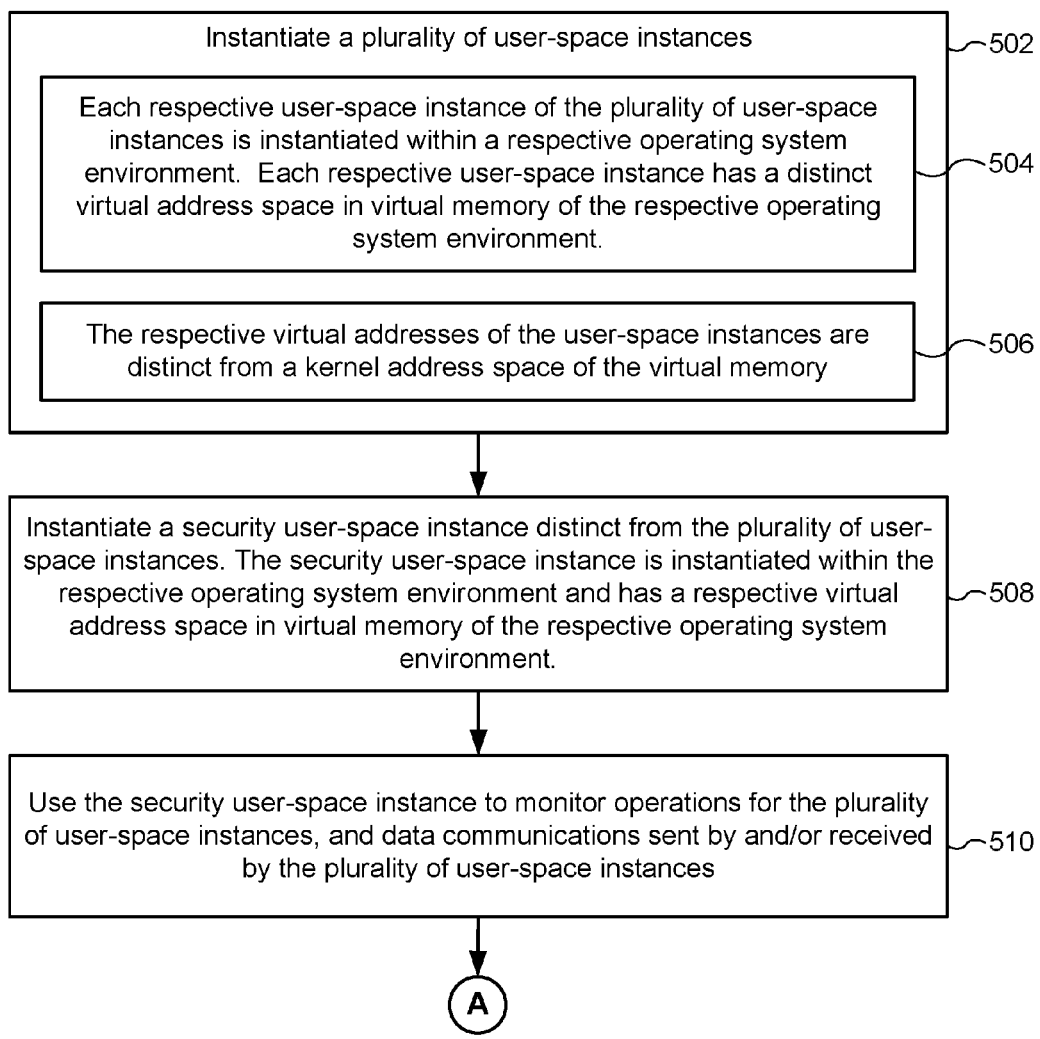
FIGS. 5A-5C are flow diagrams illustrating a method of applying security policies in a virtualization environment using a security instance, in accordance with some embodiments.
Figure 5B:
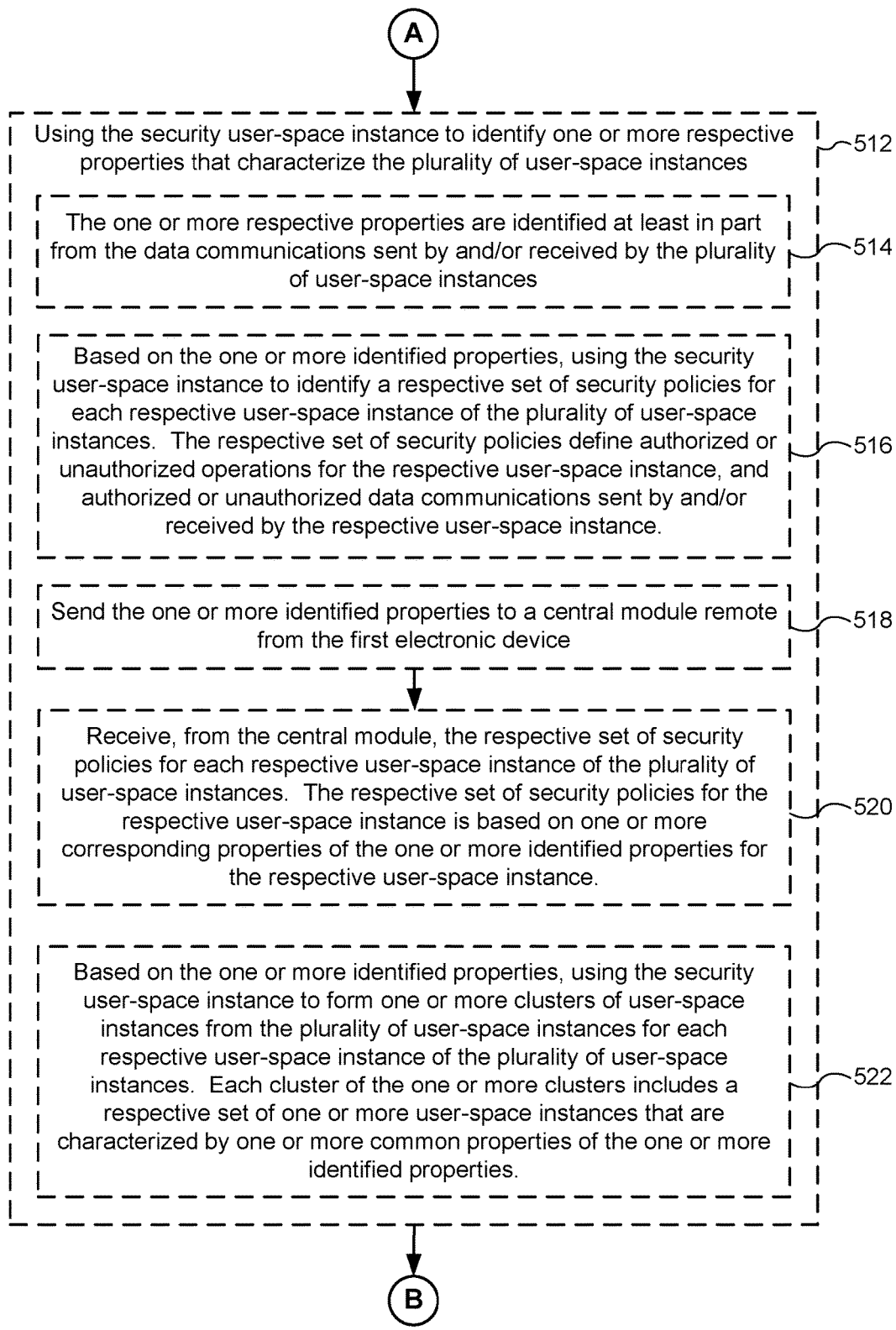
Figure 5C:
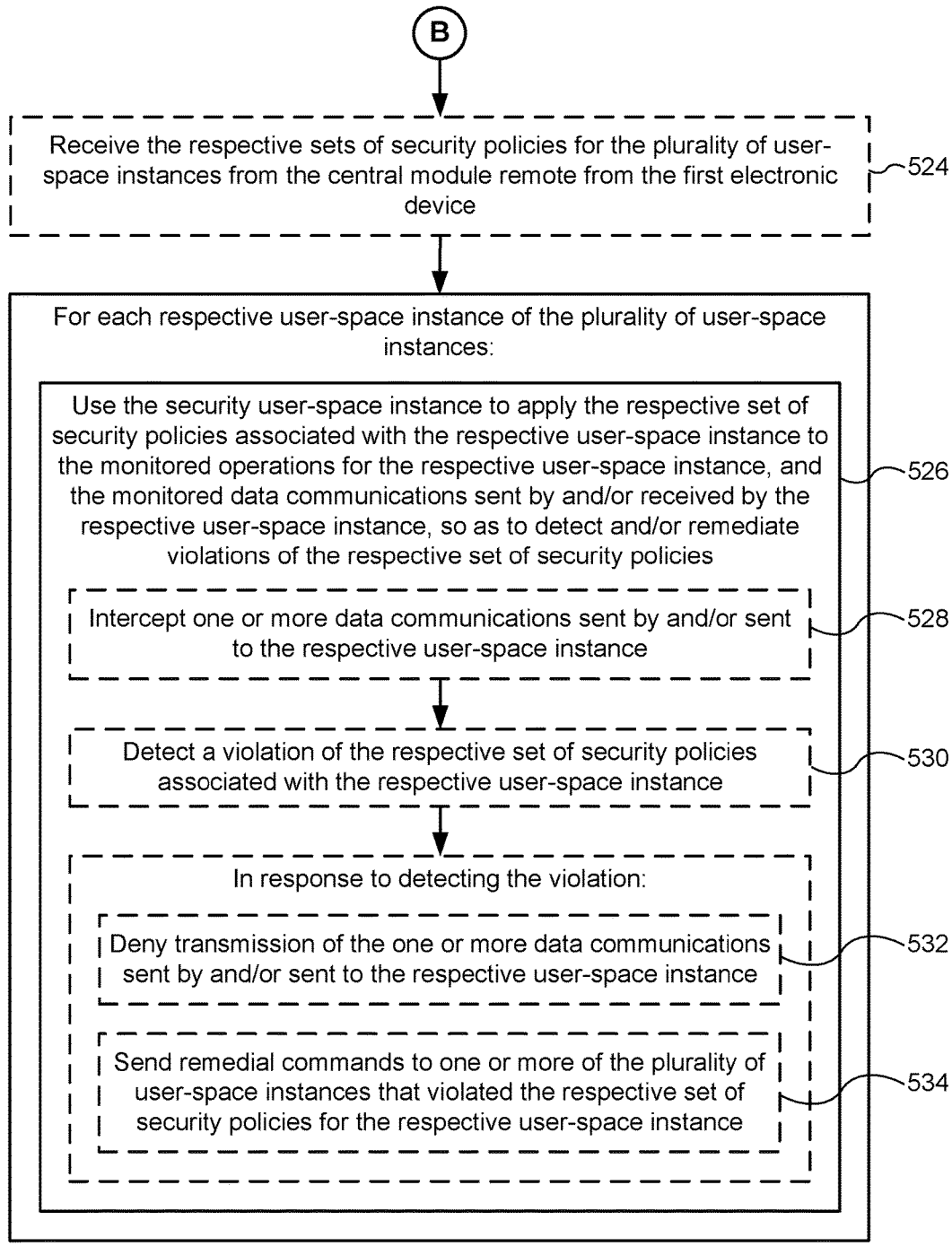

FIGS. 5A-5C are flow diagrams illustrating a method of 500 applying security policies in a virtualization environment using a security instance, in accordance with some embodiments. At least in some implementations, the method 500 is performed by one or more electronic devices of a computing network (e.g., computer systems 102, FIGS. 1A-1C, 2A-2B, and 3A-3B) or one or more components thereof (e.g., security instance 336-1, security controller 338, and/or instance engine 314, FIG. 2A). For ease of reference, the methods herein will be described as being performed by an electronic device (e.g., computer system 102-1). In some embodiments, method 500 is governed by instructions that are stored in a non-transitory computer readable storage medium and that are executed by one or more processors of an electronic device, such as the one or more processors 302 of computer system 102, as shown in FIG. 3A.

An electronic device instantiates (502) a plurality of user-space instances. Each respective user-space instance of the plurality of user-space instances is (504) instantiated within a respective operating system environment (e.g., user-space instances 110-1-1 through 110-1-3 and security instance 336-1 are instantiated within host operating system 310-1 of computer system 102-1, FIG. 2A). Each respective user-space instance has a distinct virtual address space in virtual memory of the respective operating system environment. The respective virtual address spaces of the user-space instances are (506) distinct from a kernel address space of the virtual memory. Instantiating the user-space instances may be performed in accordance with any of the embodiments discussed above with respect to the method 400 (FIGS. 4A-4D) and elsewhere in this document.

A security instance distinct from the plurality of user-space instances is instantiated (508). The security instance is instantiated within the respective operating system environment, has a respective virtual address space in virtual memory of the respective operating system environment, and is executed in user space of the respective virtual address space. The security instance is sometimes called a security user-space instance. In some embodiments, the security instance is a user-space instance of a "security application" or security module.

An example is described with respect to FIG. 2A, where security instances 336-1 and 336-2 are instantiated within the operating system environments provided by their respective host operating systems 310-1 and 310-2. As discussed in detail below, security instances are instantiated and configured to perform, in user space, one or more security functions with respect to the operations and data communications of user-space instances 110. Security instances provide the advantage of being instantiated by the same instance engines that manage the operations and data communications of user-space instances. As such, security instances, unlike host operating system processes that may not have access to or are not capable of processing the user-space operations and data communications of user-space instances, are equipped to effectively monitor, inspect, and/or apply security policies to the operations and data communications of user-space instances.

The security instance is used (510) to monitor operations for the plurality of user-space instances, and data communications sent by and/or received by the plurality of user-space instances. Referring to FIG. 2A, the security instance 336-1 is configured to monitor operations and data communications of user-space instance 110-1-1 through 110-1-3 by interfacing with the instance engine 314-1. Monitoring may be performed in accordance with any of the embodiments discussed above with respect to the method 400 (FIGS. 4A-4D) and elsewhere in this document.

Referring now to FIG. 5B, in some embodiments, the electronic device uses (512) the security instance to identify one or more respective properties that characterize the plurality of user-space instances (e.g., user-space instance type/sub-type, associated access controls, network parameters, etc.). Various examples of user-space instance properties are described with respect to the method 400 (FIGS. 4A-4D) and elsewhere in this document.

In some implementations, the one or more respective properties are identified (514) (e.g., by security instance 336) at least in part from the data communications sent by and/or received by the plurality of user-space instances (e.g., data communications between user-space instances 110). Identifying user-space instance properties may be performed in accordance with any of the embodiments discussed above with respect to the method 400 (FIGS. 4A-4D) and elsewhere in this document (e.g., deriving properties from inspected data communications, obtaining meta data specifying one or more properties, etc.).

In some implementations, based on the one or more identified properties, the security instance is used (516) to identify a respective set of security policies for each respective user-space instance of the plurality of user-space instances. The respective set of security policies define authorized or unauthorized operations for the respective user-space instance, and authorized or unauthorized data communications sent by and/or received by the respective user-space instance. Various examples of security policies are described in detail with respect to the method 400 (FIGS. 4A-4D) and elsewhere in this document.

Additionally and/or alternatively, rather than using the security instance to identify the respective set of security policies, the user-space instance sends (518) the one or more identified properties to a central module (e.g., security controller 338) remote from the first electronic device. As previously described, in some implementations, the central module is a type of host application executed within a host operating system 310 that performs one or more security functions in addition and/or alternatively to security instances 336. In other implementations, however, the central module is a module that is executed by a separate electronic device communicably coupled to but distinct from the computer systems 102 on which user-space instances are instantiated.

Here, after it receives the one or more identified properties from the security instance, the central module (e.g., security controller 338) is used to identify a respective set of security policies for each respective user-space instance of the plurality of user-space instances based on the one or more identified properties. Thereafter, the security instance receives (520), from the central module, the respective set of security policies for each respective user-space instance of the plurality of user-space instances. The respective set of security policies for the respective user-space instance is based on one or more corresponding properties of the one or more identified properties for the respective user-space instance.

Whether performed by the security instance or the central module (or both), identifying sets of security policies may be performed in accordance with any of the embodiments discussed above with respect to the method 400 (FIGS. 4A-4D) and elsewhere in this document (e.g., identifying security policies from corresponding entries in a managed data structure).

In some embodiments, based on the one or more identified properties, the security instance is used (522) to form one or more clusters of user-space instances from the plurality of user-space instances for each respective user-space instance of the plurality of user-space instances. Each cluster of the one or more clusters includes a respective set of one or more user-space instances that are characterized by one or more common properties of the one or more identified properties. As with identifying sets of security policies, in some implementations, the central module is additionally and/or alternatively used to form the one or more clusters of user-space instances from the plurality of user-space instances (after it receives the one or more identified properties from the security instance). Whether performed by the security instance or the central module (or both), forming clusters may be performed in accordance with any of the embodiments discussed above with respect to the method 400 (FIGS. 4A-4D) and elsewhere in this document (e.g., forming clusters based on one or more common properties, clusters including user-space instances from the same or different computer system 102, virtual machines 120, etc.).

In some embodiments, security policies identified for user-space instances also apply to their corresponding clusters. That is, in some implementations, a respective user-space instance of the plurality of user-space instances corresponds to a respective cluster of one or more clusters of user-space instances, the respective cluster including a respective set of user-space instances that are characterized by two or more common properties. The respective set of security policies for each respective user-space instance is further associated with a corresponding cluster of the one or more clusters of user-space instances.

Referring now to FIG. 5C, in some embodiments, the respective sets of security policies for the plurality of user-space instances are received (524) from the central module remote from the first electronic device (rather than using the security instance to identify the respective sets of security policies).

For each respective user-space instance of the plurality of user-space instances, the security instance is used (526) to apply the respective set of security policies associated with the respective user-space instance to the monitored operations for the respective user-space instance, and the monitored data communications sent by and/or received by the respective user-space instance, so as to detect and/or remediate violations of the respective set of security policies. Applying sets of security policies may be performed in accordance with any of the embodiments discussed above with respect to the method 400 (FIGS. 4A-4D) and elsewhere in this document.

In some embodiments, the security instance is configured as an in-line module that intercepts incoming or outgoing data traffic for the user-space instances. That is, in some implementations, the security instance intercepts (528) one or more data communications sent by and/or sent to the respective user-space instance. The security instance then detects (530) a violation of the respective set of security policies associated with the respective user-space instance, and in response to detecting the violation, denies (532) transmission of the one or more data communications sent by and/or sent to the respective user-space instance (e.g., data packet is dropped).

In alternative embodiments, the security instance is configured as a module that sends remedial commands to be executed. Here, the security instance detects (530) a violation of the respective set of security policies associated with the respective user-space instance. In response to detecting the violation, the security instance sends (534) remedial commands to one or more of the plurality of user-space instances that violated the respective set of security policies for the respective user-space instance (e.g., commands for terminating the compromised user-space instances, closing a network communications port, modify access controls, etc.). Other examples of remedial actions and commands are described with respect to the method 400 (FIGS. 4A-4D) and elsewhere in this document.

In some embodiments, the security instance is configured as a listening module that monitors incoming or outgoing data traffic for the user-space instances and detects violations. That is, in some implementations, the security instance monitors one or more data communications sent by and/or sent to the respective user-space instance. The security instance then detects a violation of the respective set of security policies associated with the respective user-space instance. An indication of the detected violation is transmitted to a different component of the computing network (e.g., instance engine 314, security controller 338, another computing system 102), where the indication is then used to determine a corresponding remedial action to be performed.

Multiple security instances (e.g., across different virtual machines 120, computer systems 102, etc.) are sometimes used together to provide security functionality to a computing network. For example, in some implementations, the plurality of user-space instances is a first plurality of user-space instances instantiated within a first operating system environment of a first virtual machine. A second plurality of user-space instances distinct from the first plurality of user-space instances is instantiated within a second operating system environment of a second virtual machine distinct from the first virtual machine. In these embodiments, a second security instance is instantiated within the second operating system environment of the second virtual machine, wherein the second security instance is distinct from a first security instance instantiated within the first operating system environment, and is also distinct from the first and second pluralities of user-space instances. The second security instance has a respective virtual address space in virtual memory of the second operating system environment, and is executed in user space of that respective virtual address space. The second security instance is used to monitor operations for the second plurality of user-space instances, and data communications sent by and/or received by the second plurality of user-space instances. Furthermore, for each respective user-space instance of the second plurality of user-space instances, the second security user-space instance is used to apply a respective set of security policies associated with the respective user-space instance of the second plurality of user-space instances to the monitored operations for the respective user-space instance, and the monitored data communications sent by and/or received by the respective user-space instance of the second plurality of user-space instances, so as to detect and/or remediate violations of the respective set of security policies associated with the respective user-space instance of the second plurality of user-space instances.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user. Furthermore, the method 400 (FIGS. 4A-4D) may be analogously performed in accordance with any of the embodiments described with respect to the method 500 (FIGS. 5A-5C), and vice versa.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of applying security policies in a virtualization environment, comprising:
at an electronic device of a plurality of electronic devices in a computing network, the electronic device having one or more processors and memory storing instructions for execution by the one or more processors:
instantiating a plurality of user-space instances, wherein:
each respective user-space instance of the plurality of user-space instances is instantiated within a respective operating system environment of a first virtual machine, has a distinct virtual address space in virtual memory of the respective operating system environment, and is for executing a respective application in user space of the distinct virtual address space; and
the respective virtual address spaces of the user-space instances are distinct from a kernel address space of the virtual memory;
instantiating a security instance distinct from the plurality of user-space instances, wherein the security instance is instantiated within the respective operating system environment of the first virtual machine, has a respective virtual address space in virtual memory of the respective operating system environment that is distinct from the virtual address spaces of the plurality of user-space instances instantiated within the respective operating system environment of the first virtual machine, and is executed in user space of the respective virtual address space;
using the security instance to monitor operations for the plurality of user-space instances, and data communications sent by and/or received by the plurality of user-space instances; and
for each respective user-space instance of the plurality of user-space instances, using the security instance to apply a respective set of security policies associated with the respective user-space instance to the monitored operations for the respective user-space instance and the monitored data communications sent by and/or received by the respective user-space instance, so as to detect and/or remediate violations of the respective set of security policies.

2. The method of claim 1, wherein using the security instance to apply the respective set of security policies comprises, for each respective user-space instance of the plurality of user-space instances:
intercepting one or more data communications sent by and/or sent to the respective user-space instance;
detecting a violation of the respective set of security policies associated with the respective user-space instance; and
in response to detecting the violation, denying transmission of the one or more data communications sent by and/or sent to the respective user-space instance.

3. The method of claim 1, wherein using the security instance to apply the respective set of security policies comprises, for each respective user-space instance of the plurality of user-space instances:
detecting a violation of the respective set of security policies associated with the respective user-space instance; and
in response to detecting the violation, sending remedial commands to one or more of the plurality of user-space instances that violated the respective set of security policies for the respective user-space instance.

4. The method of claim 1, further comprising using the security instance to identify one or more respective properties that characterize the plurality of user-space instances.

5. The method of claim 4, wherein the one or more respective properties are identified at least in part from the data communications sent by and/or received by the plurality of user-space instances.

6. The method of claim 4, further comprising, for each respective user-space instance of the plurality of user-space instances:
based on the one or more identified properties, using the security instance to identify the respective set of security policies, wherein the respective set of security policies define authorized or unauthorized operations for the respective user-space instance, and authorized or unauthorized data communications sent by and/or received by the respective user-space instance.

7. The method of claim 4, further comprising, for each respective user-space instance of the plurality of user-space instances:
based on the one or more identified properties, using the security instance to form one or more clusters of user-space instances from the plurality of user-space instances, wherein each cluster of the one or more clusters includes a respective set of one or more user-space instances that are characterized by one or more common properties of the one or more identified properties.

8. The method of claim 4, further comprising sending the one or more identified properties to a central module remote from the electronic device.

9. The method of claim 8, further comprising receiving, from the central module, the respective set of security policies for each respective user-space instance of the plurality of user-space instances, wherein the respective set of security policies for the respective user-space instance is based on one or more corresponding properties of the one or more identified properties for the respective user-space instance.

10. The method of claim 1, further comprising receiving the respective sets of security policies for the plurality of user-space instances from a central module remote from the electronic device.

11. The method of claim 1, wherein:
the plurality of user-space instances is a first plurality of user-space instances instantiated within a first operating system environment of the first virtual machine;
a second plurality of user-space instances distinct from the first plurality of user-space instances is instantiated within a second operating system environment of a second virtual machine distinct from the first virtual machine; and
the security instance is a first security instance that is instantiated within the first operating system environment of the first virtual machine,
the method further comprising:
instantiating a second security instance within the second operating system environment of the second virtual machine, wherein the second security instance is distinct from the first security instance and the first and second pluralities of user-space instances, and wherein the second security instance is executed in user space of a respective virtual address space in virtual memory of the second operating system environment;
using the second security instance to monitor operations for the second plurality of user-space instances, and data communications sent by and/or received by the second plurality of user-space instances; and
for each respective user-space instance of the second plurality of user-space instances, using the second security instance to apply a respective set of security policies associated with the respective user-space instance of the second plurality of user-space instances to the monitored operations for the respective user-space instance, and the monitored data communications sent by and/or received by the respective user-space instance of the second plurality of user-space instances, so as to detect and/or remediate violations of the respective set of security policies associated with the respective user-space instance of the second plurality of user-space instances.

12. The method of claim 1, wherein:
a respective user-space instance of the plurality of user-space instances corresponds to a respective cluster of one or more clusters of user-space instances, the respective cluster including a respective set of user-space instances that are characterized by two or more common properties; and
the respective set of security policies for each respective user-space instance is further associated with a corresponding cluster of the one or more clusters of user-space instances.

13. A method of applying application-specific security policies, comprising:
at an electronic device of a plurality of electronic devices in a computing network, the electronic device having one or more processors and memory storing instructions for execution by the one or more processors:
instantiating a plurality of user-space instances, wherein:
each respective user-space instance of the plurality of user-space instances is instantiated within a respective operating system environment of a first virtual machine, has a distinct virtual address space in virtual memory of the respective operating system environment, and is for executing a respective application in user space of the distinct virtual address space;
the respective virtual addresses of the user-space instances are distinct from a kernel address space of the virtual memory; and
each of the plurality of user-space instances corresponds to a respective cluster of one or more clusters of user-space instances, wherein each of the one or more clusters includes a respective set of one or more user-space instances that are characterized by one or more common properties; and
instantiating a security user-space instance distinct from the plurality of user-space instances, wherein the security user-space instance is instantiated within a respective operating system environment that is distinct from the virtual address spaces of the plurality of user-space instances instantiated within the respective operating system environment of the first virtual machine, and has a respective virtual address space in virtual memory of the respective operating system environment;
using the security user-space instance to monitor operations for the plurality of user-space instances, and data communications sent by and/or received by the plurality of user-space instances; and
for each respective cluster of the one or more clusters, using the security user-space instance to apply a respective set of security policies associated with the respective cluster to the monitored operations for respective user-space instances of the respective cluster, and the monitored data communications sent by and/or received by the respective user-space instances of the respective cluster, so as to detect and/or remediate violations of the respective set of security policies.

14. An electronic device in a computing network having a plurality of electronic devices, the electronic device comprising:

one or more processors; and memory storing one or more programs for execution by the processor, the one or more programs including instructions that when executed by the one or more processors, cause the electronic device to perform operations, including:

instantiating a plurality of user-space instances, wherein:

each respective user-space instance of the plurality of user-space instances is instantiated within a respective operating system environment of a first virtual machine, has a distinct virtual address space in virtual memory of the respective operating system environment, and is for executing a respective application in user space of the distinct virtual address space; and the respective virtual address spaces of the user-space instances are distinct from a kernel address space of the virtual memory;

instantiating a security instance distinct from the plurality of user-space instances, wherein the security instance is instantiated within the respective operating system environment of the first virtual machine, has a respective virtual address space in virtual memory of the respective operating system environment that is distinct from the virtual address spaces of the plurality of user-space instances instantiated within the respective operating system environment of the first virtual machine, and is executed in user space of the respective virtual address space;

using the security instance to monitor operations for the plurality of user-space instances, and data communications sent by and/or received by the plurality of user-space instances; and for each respective user-space instance of the plurality of user-space instances, using the security instance to apply a respective set of security policies associated with the respective user-space instance to the monitored operations for the respective user-space instance and the monitored data communications sent by and/or received by the respective user-space instance, so as to detect and/or remediate violations of the respective set of security policies.

15. The electronic device of claim 14, wherein using the security instance to apply the respective set of security policies comprises, for each respective user-space instance of the plurality of user-space instances:

intercepting one or more data communications sent by and/or sent to the respective user-space instance;

detecting a violation of the respective set of security policies associated with the respective user-space instance; and in response to detecting the violation, denying transmission of the one or more data communications sent by and/or sent to the respective user-space instance.

16. The electronic device of claim 14, wherein using the security instance to apply the respective set of security policies comprises, for each respective user-space instance of the plurality of user-space instances:

detecting a violation of the respective set of security policies associated with the respective user-space instance; and in response to detecting the violation, sending remedial commands to one or more of the plurality of user-space instances that violated the respective set of security policies for the respective user-space instance.

17. The electronic device of claim 14, wherein the one or more programs further comprise instructions for using the security instance to identify one or more respective properties that characterize the plurality of user-space instances.

18. The electronic device of claim 17, wherein the one or more respective properties are identified at least in part from the data communications sent by and/or received by the plurality of user-space instances.

19. A non-transitory computer readable storage medium, storing one or more programs for execution by one or more processors of an electronic device in a computing network, the one or more programs including instructions that when executed one or more processors of the electronic device cause the electronic device to perform operations including:

instantiating a plurality of user-space instances, wherein:

each respective user-space instance of the plurality of user-space instances is instantiated within a respective operating system environment of a first virtual machine, has a distinct virtual address space in virtual memory of the respective operating system environment, and is for executing a respective application in user space of the distinct virtual address space; and the respective virtual address spaces of the user-space instances are distinct from a kernel address space of the virtual memory;

instantiating a security instance distinct from the plurality of user-space instances, wherein the security instance is instantiated within the respective operating system environment of the first virtual machine, has a respective virtual address space in virtual memory of the respective operating system environment that is distinct from the virtual address spaces of the plurality of user-space instances instantiated within the respective operating system environment of the first virtual machine, and is executed in user space of the respective virtual address space;

using the security instance to monitor operations for the plurality of user-space instances, and data communications sent by and/or received by the plurality of user-space instances; and for each respective user-space instance of the plurality of user-space instances, using the security instance to apply a respective set of security policies associated with the respective user-space instance to the monitored operations for the respective user-space instance and the monitored data communications sent by and/or received by the respective user-space instance, so as to detect and/or remediate violations of the respective set of security policies.

20. The non-transitory computer readable storage medium of claim 19, wherein using the security instance to apply the respective set of security policies comprises, for each respective user-space instance of the plurality of user-space instances:

intercepting one or more data communications sent by and/or sent to the respective user-space instance;

detecting a violation of the respective set of security policies associated with the respective user-space instance; and in response to detecting the violation, denying transmission of the one or more data communications sent by and/or sent to the respective user-space instance.

21. The electronic device of claim 14, wherein:

the plurality of user-space instances is a first plurality of user-space instances instantiated within a first operating system environment of the first virtual machine;

a second plurality of user-space instances distinct from the first plurality of user-space instances is instantiated within a second operating system environment of a second virtual machine distinct from the first virtual machine; and the security instance is a first security instance that is instantiated within the first operating system environment of the first virtual machine, wherein the one or more programs further comprise instructions for:

instantiating a second security instance within the second operating system environment of the second virtual machine, wherein the second security instance is distinct from the first security instance and the first and second pluralities of user-space instances, and wherein the second security instance is executed in user space of a respective virtual address space in virtual memory of the second operating system environment;

using the second security instance to monitor operations for the second plurality of user-space instances, and data communications sent by and/or received by the second plurality of user-space instances; and for each respective user-space instance of the second plurality of user-space instances, using the second security instance to apply a respective set of security policies associated with the respective user-space instance of the second plurality of user-space instances to the monitored operations for the respective user-space instance, and the monitored data communications sent by and/or received by the respective user-space instance of the second plurality of user-space instances, so as to detect and/or remediate violations of the respective set of security policies associated with the respective user-space instance of the second plurality of user-space instances.

* * * * *